Nov. 17, 1959  G. H. TABER  2,913,253
RUNNING GEAR AND SPRING SUSPENSION FOR MOTOR VEHICLES
Filed June 14, 1956  10 Sheets-Sheet 1

INVENTOR.
George H. Taber
By Shoemaker & Mattare
ATTYS

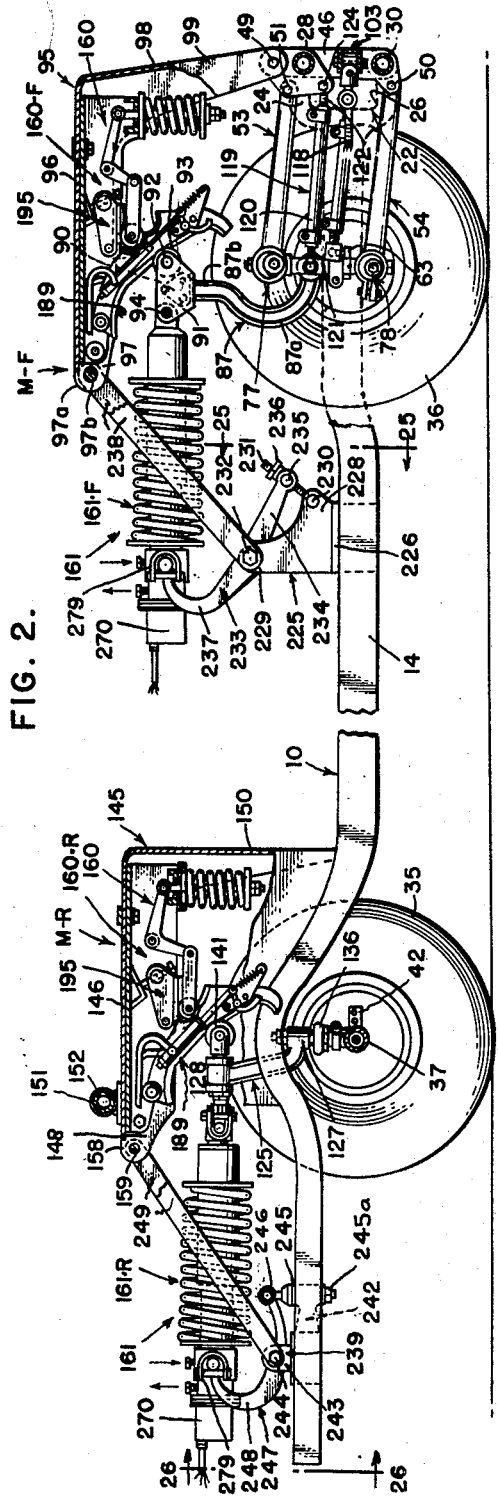
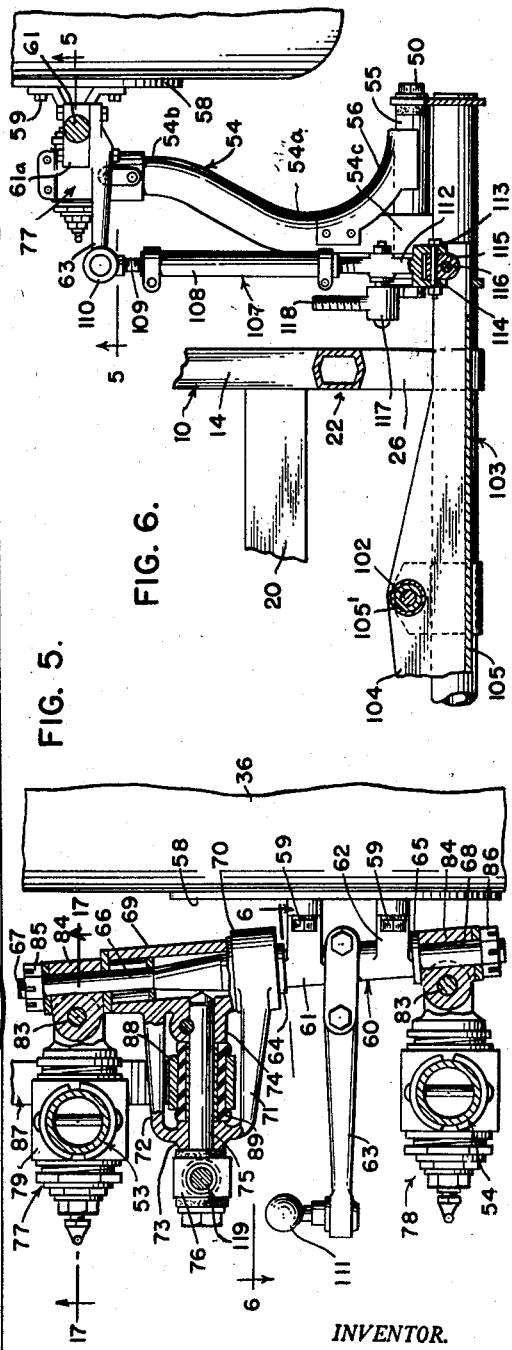
FIG. 2.
FIG. 5.
FIG. 6.
INVENTOR.
GEORGE H. TABER
BY
Shoemaker & Mattare
ATTYS Nov. 17, 1959  G. H. TABER  2,913,253
RUNNING GEAR AND SPRING SUSPENSION FOR MOTOR VEHICLES
Filed June 14, 1956  10 Sheets-Sheet 3

INVENTOR.
George H. Taber
BY
Shoemaker & Mattare
ATTYS

Nov. 17, 1959  G. H. TABER  2,913,253
RUNNING GEAR AND SPRING SUSPENSION FOR MOTOR VEHICLES
Filed June 14, 1956  10 Sheets-Sheet 4

Inventor
George H. Taber
By Shoemaker & Mattare
ATTYS

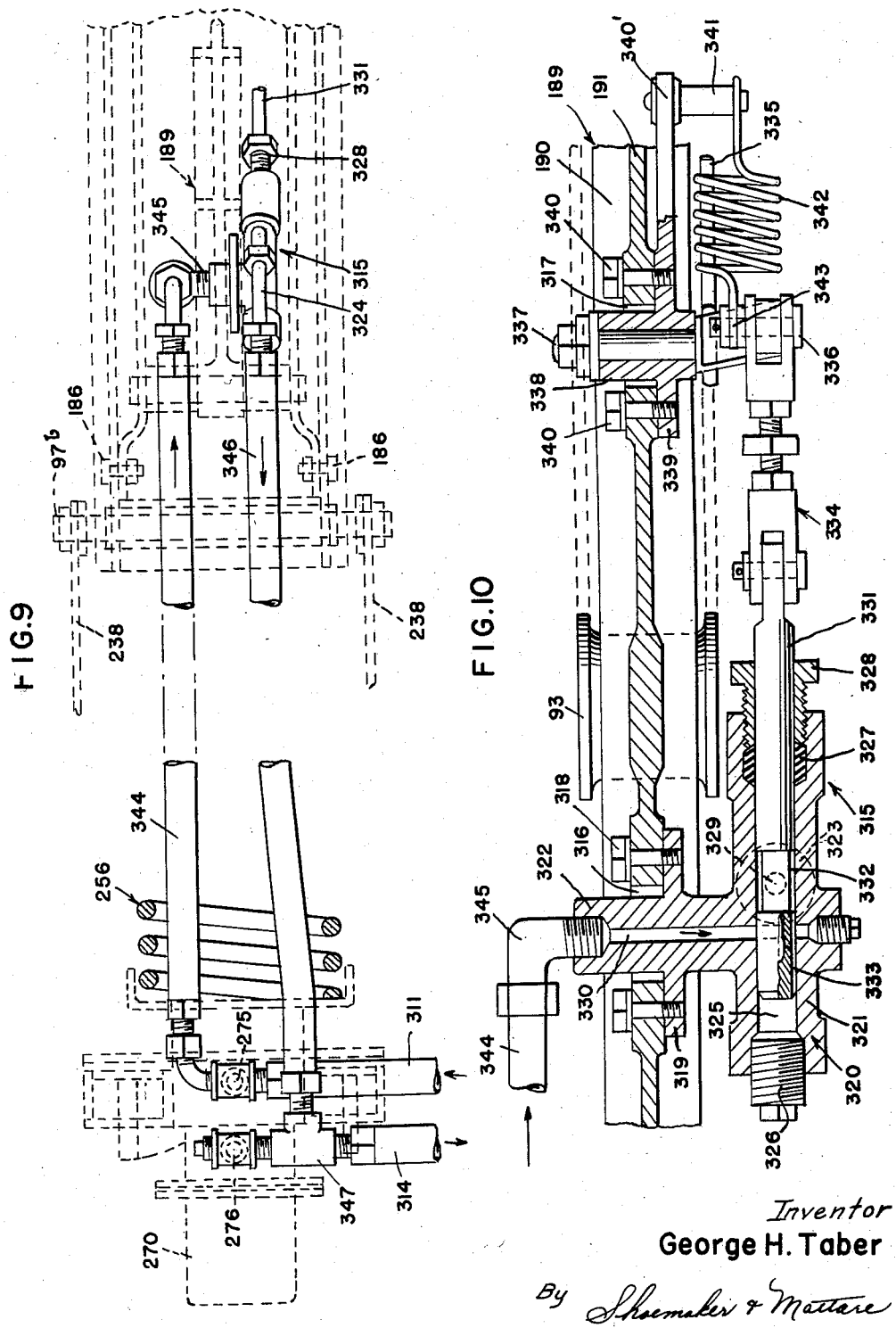

Nov. 17, 1959  G. H. TABER  2,913,253
RUNNING GEAR AND SPRING SUSPENSION FOR MOTOR VEHICLES
Filed June 14, 1956  10 Sheets-Sheet 6

Inventor
George H. Taber
By Shoemaker & Mattare
ATTYS

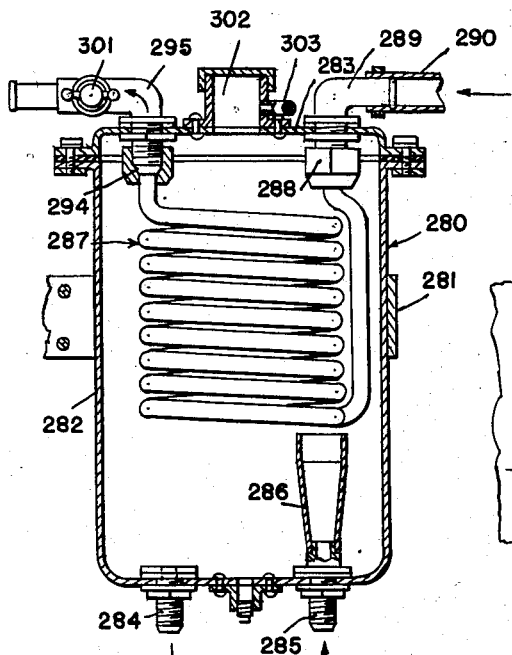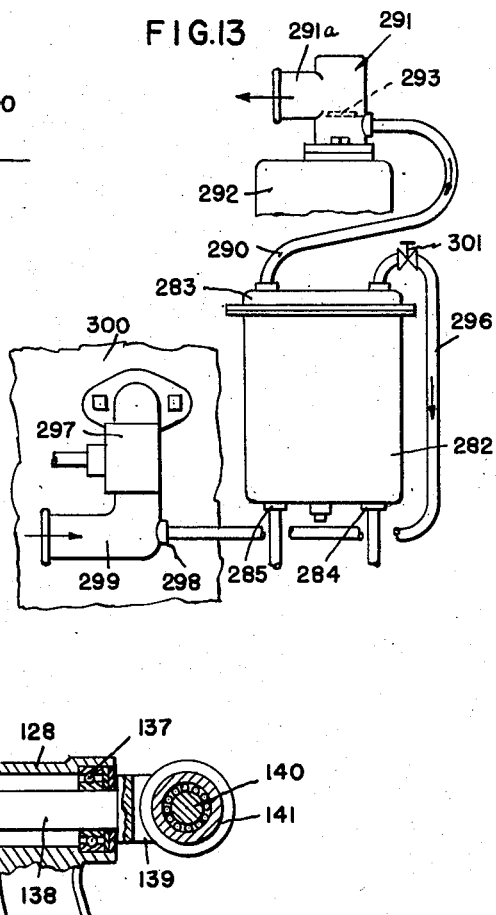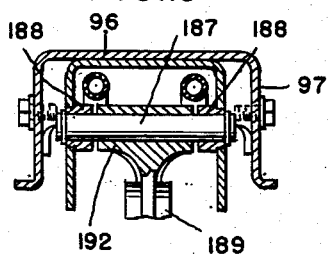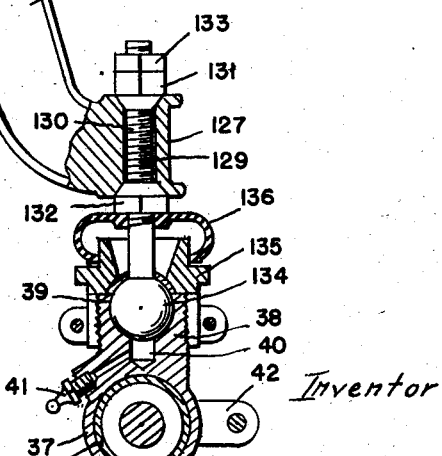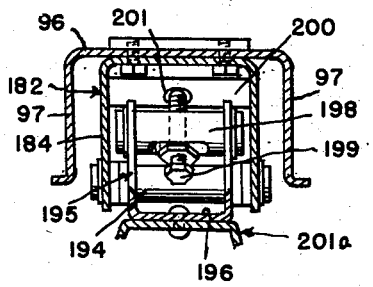

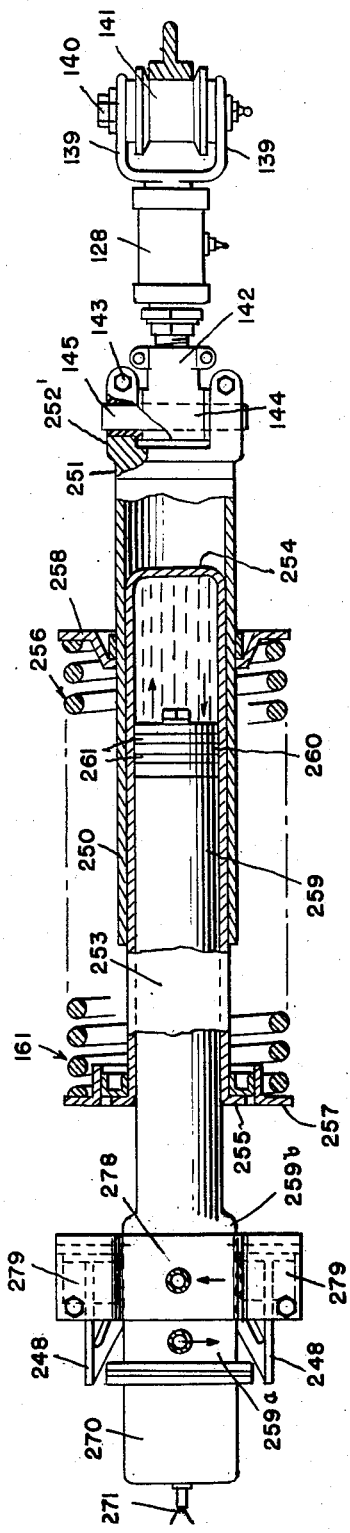

Nov. 17, 1959  G. H. TABER  2,913,253
RUNNING GEAR AND SPRING SUSPENSION FOR MOTOR VEHICLES
Filed June 14, 1956  10 Sheets-Sheet 9

Inventor
George H. Taber
By Shoemaker & Mattare
ATTYS

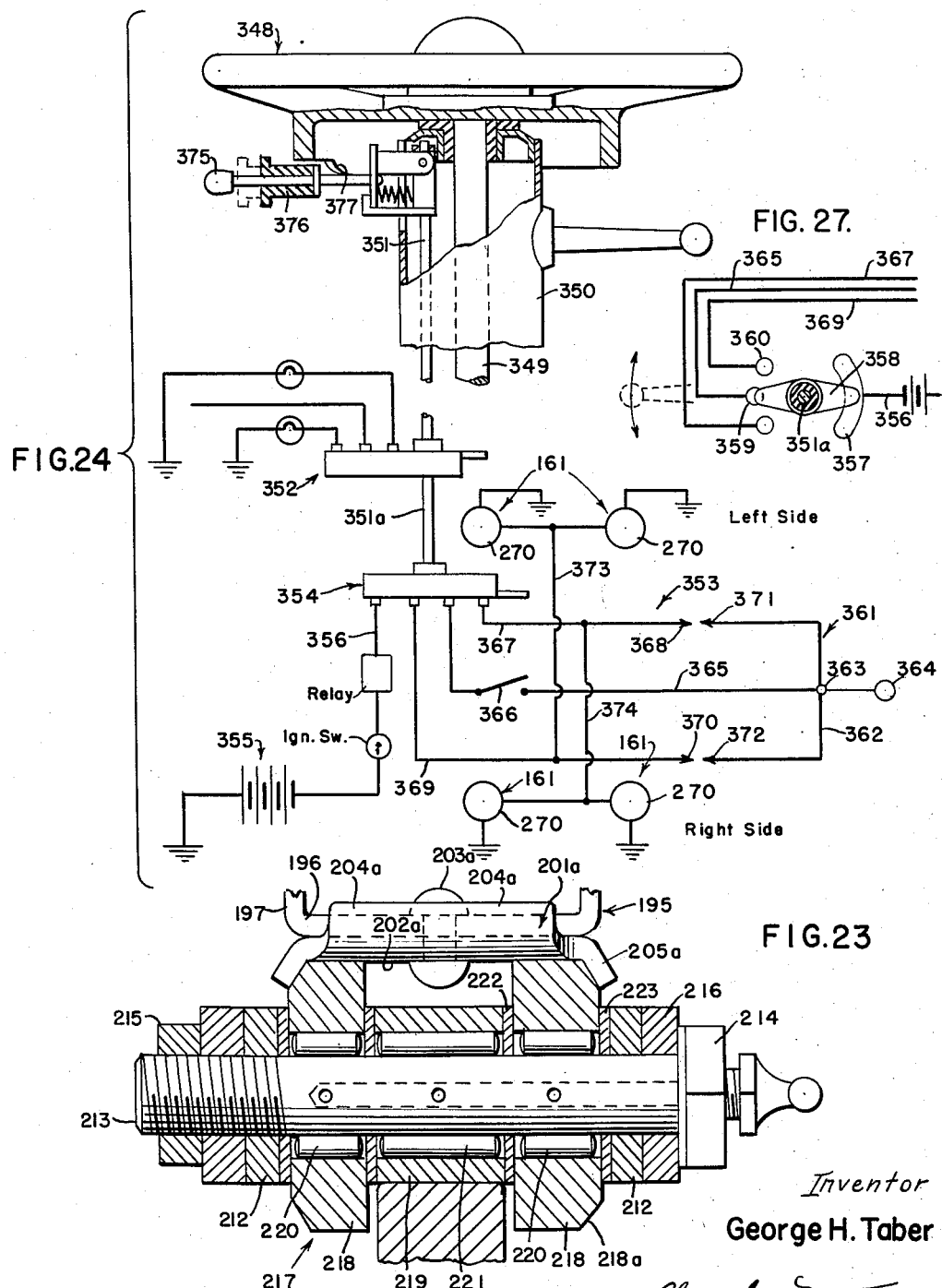

United States Patent Office 2,913,253
Patented Nov. 17, 1959

2,913,253

RUNNING GEAR AND SPRING SUSPENSION FOR MOTOR VEHICLES

George H. Taber, Elmira, N.Y.

Application June 14, 1956, Serial No. 591,449

42 Claims. (Cl. 280—124)

This invention relates generally to improvements in running gear for motor vehicles, and particularly to passenger vehicles, although the invention is not restricted to the same and the term "running gear" contemplates both the spring suspension mechanism and the steering mechanism for the vehicle, such spring suspension and steering mechanisms being particularly designed for cooperative operation or action to jointly contribute to the attainment of the objects desired.

The invention of the present application is based upon my prior applications Serial No. 432,356, filed May 26, 1954 and Serial No. 504,807, filed April 29, 1955.

Motor vehicles generally and particularly pleasure cars of current body styling have so reduced the spacing between the body frame members and the roadway surface that the amount or extent of what is known as the "jounce" space between the front running gear members is, in substantially all makes of cars, very small or in the neighborhood of two and a half inches. Between the rear axle housing of the vehicle and the body support frame this spacing is slightly greater but is still small being in the vicinity of six inches. Accordingly, in the use of coil springs in the conventional four locations for the vehicle springs, for body support or suspension, the strength or spring rate for such springs must be high to support various body loads in order to prevent the body frame from riding on the rubber bumpers which are interposed between the running gear and the body frame members.

With such reduced jounce space between the running gear and the body structure at the front and rear of the vehicle and the necessity of providing conventional springs of high strength or high spring rate, even though such coil springs are free from any frictional snubbing action such as may be found in leaf spring constructions, the high spring rate necessary or required to compensate for passenger overloads results in powerful spring rebound action when the vehicle wheels ride over a rise in the road or drop into a depression, which consequently requires recoil snubbers of sufficient snubability to snub or retard the rebound energy momentarily stored or built up in the resilient suspension elements.

The character of currently used spring recoil snubbers, whether of the hydraulic or the strap types, is such that upon the commencement of rebound, they momentarily quite rigidly tie in the body with the running gear and reduce or destroy the suspension flexibility of the suspension mechanism and this is particularly emphasized in zero weather.

Also, because of the present location of the resilient support means for a vehicle body being too far below the body center of gravity, upon the making of a steering turn, particularly where the vehicle is travelling at a relatively high rate of speed, inertia of the entire car body and the passenger load causes the car body to tend to follow a straight line of travel, thereby producing a contrary transverse inclination of the car body which produces in the steerable wheels of an independent wheel suspension structure, a powerful tractional steering urge contrary to the wheel axis camber and opposing that required for the intended steering direction.

One of the objects of the present invention in view of the foregoing, is to eliminate, or at least reduce to a considerable degree, the undesirable results above set forth as being associated with motor vehicle suspension mechanisms of the types at present in use, by providing means to cancel contrary transverse inclinations of the vehicle body incident to the steering of the vehicle around a turn or curve, by the use of a jointed parallelogram suspension control means to hold the axis of independent wheel suspensions steerable wheels to a constant zero camber relation with the vehicle body by which it becomes possible to elevate the effective resilient elements of the body support mechanism to a height above the car body center of gravity to an extent which is limited only by the car front fender styling and by providing a mechanism for effecting such elevation.

Another object of the invention is to provide in a motor vehicle independent coil spring wheel suspension mechanism associated with a jointed parallelogram structure for controlling or actuating the steerable wheels, a means to control the spring rate in such a manner that the vehicle operator can employ by selection one or the other of two ride conditions. Under one of such ride conditions, there is provided a substantially normal noncontrolled spring rate relative to normal jounce spacing between the vehicle body frame and running gear members and under the other riding condition, there is provided a means for effecting vehicle body elevation above the normal elevation and a jounceless low spring rate ride condition is had through the employment of an adjustable camming means.

The invention has for another of its objects the provision of means whereby steering knuckle members of the steerable wheels of an automotive vehicle in a so called independent wheel suspension structure, resiliently support the vehicle body through the medium of a movable inclined cam interposed between such knuckle members and a horizontally disposed coil spring, the rate of which spring can be varied by designed contours of the cam surface or tilting of the cam to present its different cam surface contours to an engaging roller follower which is urged against the contoured cam face by the spring.

Still another object of the invention is to provide in a mechanism of the above described character, a second cam associated with each of the first mentioned cams with body support rollers interposed between the second cam and a guiding body support member arranged in a substantially horizontal plane and wherein such interposed rollers are actuated by the action of a hydraulic pressure means against the master body support spring to effect overload compensation by forcing a "kick-back" of the movable inclined cam to an angle approaching a horizontal position and thereby increase spring rate of the resilient body support.

Another object of the present invention is to provide an improved and new type of independent wheel spring suspension mechanism wherein the suspension springs are of coil form and disposed horizontally and transmit thrust through a flanged body support roller, against an inclinable, adjustable cam mechanism interposed between an end of each spring and the adjacent part of the vehicle body with a jointed connection between said end of the spring and the adjacent underlying portion of the running gear, such new and improved spring suspension arrangement being such that the effective resilient elements may be elevated by hydraulically controlled means above the car body center of gravity and above the normal body elevation to increase jounce space.

A further object of the invention is to provide, in a new spring suspension mechanism of the above-described character, a novel overload compensating mechanism which functions automatically under overload to cause an increase of pressure in a hydraulic pressure unit, against the master support spring and bring about the overpowering of a load compensation spring to change or alter the effective angle of the load sustaining cam unit through which forces are transmitted to the adjacent suspension spring.

Another object of the invention is to provide in association with independent wheel suspension mechanism constructed and arranged as above set forth, a hydraulic means for effecting a desired elevation of the vehicle body and to set the resilient suspension to a low spring rate state so as to provide a soft riding condition and which fluid pressure elevation of the body not only provides for a greater jounce spacing, but also permits an increased angular range for increase of transverse body inclination.

Still another object of the invention is to provide a means for accomplishing the aforegoing objects whereby also to aid in the relationship of the steerable wheel camber to the direction of intended steering.

Another object of the invention is to provide, in mechanism of the above-described character designed to effect the elevation of the vehicle body by hydraulic means, a new and novel means for preventing raising of the vehicle body beyond a desired safe elevated position.

Another object is to provide an electrical means for automatically restoring the vehicle body to or moving it toward a stable horizontal condition when making a turn or rounding a curve while the body has been raised to an elevated position with respect to the vehicle running gear and also to provide means for cut out of the electrical control means for the hydraulic elevating units when the vehicle engine operated hydraulic pump which supplies fluid under pressure to such units is cut out of service.

Another object is to provide in mechanism of the character stated a novel means of mounting the front end spring suspension units upon the combination steering knuckle-spindle bolt and also for stabilizing such mounting.

A further object is to provide mechanism for maintenance of steerable wheel camber to a constant zero camber relation with the car body regardless of increased range of relative movement between the car body and the axis of steerable running gear wheels and the wheel alignment is kept the same regardless of passenger load or transverse inclinations of the vehicle body.

Another object of the invention is to provide in a motor vehicle individual wheel suspension and steering mechanism of the character stated, an operative coupling between the body support over the rear end mechanism and the differential housing whereby free vertical movement of the vehicle body and the turning of the vehicle body on a central longitudinal axis is permitted but lateral shifting of the vehicle body and frame relative to the underlying running gear is prevented.

The invention will be best understood from a consideration of the following detailed description taken in connection with the accompanying drawings forming a part of the specification with the understanding, however, that the invention is not confined to a strict conformity with the showing of the drawings, but may be changed or modified so long as such changes or modifications mark no material departure from the salient features of the invention as expressed in the appended claims.

In the drawings:

Figure 2 is a longitudinal section taken substantially upon the line 2—2 of Figure 1 and showing in longitudinal section the body supporting trusses and subtrusses for the front and rear wheels upon one side of the chassis;

Figure 5 is a detail section on an enlarged scale taken approximately on the line 5—5 of Figure 6, taken in front of the camber caster adjustments and through the wheel tractor arms and showing the steering arm in elevation;

Figure 6 is a horizontal section taken substantially on the line 6—6 of Figure 5;

Figure 9 is a view showing on an enlarged scale details of the automatic overload compensation mechanism with adjacent parts of the body support truss, subtruss, cam structure and body elevating unit in dotted outline;

Figure 10 is a sectional view taken substantially on the line 10—10 of Figure 8;

Figure 13 illustrates the connections between the hydraulic fluid reservoir and the motor vehicle cooling system whereby the water from the system is employed to maintain a desired temperature for the hydraulic fluid in the reservoir;

Figure 14 is a vertical sectional view taken through the hydraulic fluid reservoir showing details of the fluid connections and interior parts;

Figure 15 is a detail view partly in section and partly in elevation of one body support unit on the rear axle housing;

Figure 16 is a view in top plan of a rear hydraulic support unit, with parts thereof in section and showing particularly, in top plan, the connection between the unit and the adjacent rear main support arm and also showing the flanged roller engaging the adjacent support cam;

Figure 17 is a horizontal section taken substantially on line 17—17 of Figure 5;

Figure 18 is a sectional view taken substantially on the line 18—18 of Figure 17;

Figure 19 is a section taken substantially on line 19—19 of Figure 8;

Figure 20 is a section taken substantially on the line 20—20 of Figure 8;

Figure 23 is a section, on an enlarged scale, taken subsatntially on line 23—23 of Figure 8;

Figure 24 is a diagrammatic illustration of the electrical system for automatically and manually controlling the electro-hydraulic units and showing manual controls mounted on the vehicle steering post.

Figure 27 is a diagrammatic illustration of the current distributing switch operated by the turn signal control shaft extension.

Figure 1:
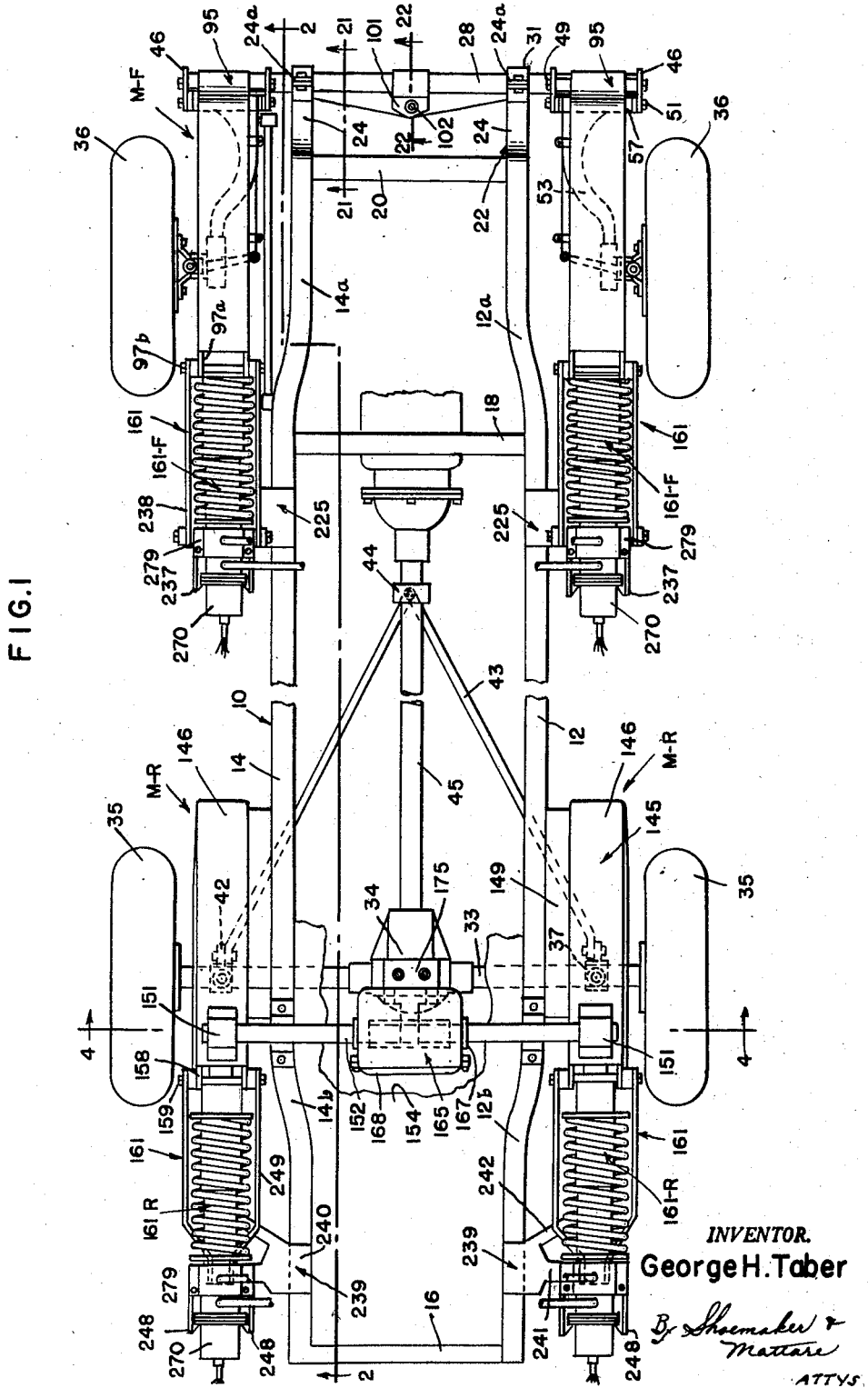
Figure 1 is a view in top plan of a motor vehicle chassis showing the improved independent four-wheel suspension structure and steering mechanism constructed in accordance with the present invention.

Referring now more particularly to the drawings, the numeral 10 generally designates a motor vehicle chassis frame in association with which the several mechanisms of the present invention are shown, and this frame is illustrated as comprising the right and left side beams 12 and 14, respectively, the rear ends of which are here shown as joined by the cross-beam 16 with the longitudinally spaced front end cross members 18 and 20, the member 18 being positioned to carry the transmission.

As shown in Figure 2, the longitudinal side beams of the chassis frame are upwardly bowed adjacent to their rear ends where they pass over the rear axle housing, while at their front ends, the side beams curve inwardly slightly, as indicated at 12a and 14a, whereby the front of the frame is transversely narrowed, as shown in Figure 1.

Also, the rear of the frame is reduced in width slightly by having the side beams curving inwardly, as indicated at 12b and 14b, respectively.

Each of the side beams 12 and 14 is further modified in its construction at its front end to provide the forwardly directing fork, generally designated 22, and comprising vertically spaced upper and lower arms 24 and 26, respectively.

Each of the arms 24 and 26 is formed to provide a forwardly directed transverse channel 24a and 24b, respectively, to receive the transverse upper and lower steering mechanism supporting cross-beams 28 and 30, respectively, which are secured in position, in the preferred structure here shown, by means of caps 31 and 32 for the upper and lower arms 24 and 26, respectively.

The numeral 33 generally designates the rear axle housing which includes the conventional differential case 34 and at the outer ends of which housing are the rear wheels 35.

Numeral 36 designates the front wheels and tires.

Encircling and secured to the rear axle housing adjacent to each wheel 35 and approximately midway between the wheel and the adjacent side beam of the chassis frame is a collar 37 which is formed integral with an upstanding threaded post 38 having formed in the top thereof a ball socket 39 as shown in Figure 15 for the purpose hereinafter set forth.

The bottom of this socket has a lubricant well 40 to receive lubricant introduced through the fitting 41.

Each of the collars 37 has formed integral therewith an ear 42 with which is connected one end of one of two forwardly extending converging brace rods 43 which are attached by a collar 44 to the drive shaft housing 45, as shown in Figure 1.

Referring now to the front end structure, it will be seen that the adjacent outer ends of the beams 28 and 30 are securely fastened together by a vertical connector plate 46, while inwardly from each of these plates 46, the upper or top beam 28 has rigidly secured thereto a substantially triangular plate 47 and below this plate, the beam 30 carries an ear plate 48.

Each of the connector plates 46 has a projecting upper end 46a which cooperates with the upwardly extending end of the adjacent triangular plate 47 to support a body support bolt 49 for the purpose hereinafter set forth, while the lower end of each of the connector plates 46 has a downwardly and rearwardly extending terminal ear 46b which is coupled to the adjacent ear plate 48 by a wheel tractor arm pivot bolt 50.

Directly above the pivot bolt 50, an upper pivot bolt 51 connects the triangular plate 47 with a rearwardly projecting tab portion 52 of the adjacent connector plate 46 for the support of an upper tractor arm about to be described.

At each side of the forward end of the vehicle chassis frame and operatively coupled with the transverse upper and lower beams are two rearwardly extending vertically spaced wheel tractor arms.

The upper arm of each pair is generally designated 53, while the lower arm of each pair is generally designated 54, and as will be seen upon reference to Figure 6, where one of the arms is shown in top plan and which arm is formed like each of the others, the arm is bowed inwardly toward the chassis frame from its forward end and terminates in a straight rear portion which is connected in the manner hereinafter set forth with an end of the steering wheel spindle bolt.

Referring particularly to Figure 6, the tractor arm shown is the lower arm on the left side of the vehicle, and the inwardly bowed forward end portion is designated 54a while the straight terminal rear end portion is designated 54b. This arm is here illustrated, and is representative of the form of each of the other arms, as comprising a single member which may be of tubular character which has a forward terminal portion 54c which is secured to a bearing sleeve 55 supported on the pivot bolt 50 and between this forward end portion 54c and the bearing sleeve 55 at the outer end of the latter is a curved brace member 56.

In place of the construction illustrated in Figure 6 for the forward end of the tractor arm 54, such forward end in the portion 54c may be curved outwardly and secured in a suitable manner as by welding or in any other way, to the central portion of bearing sleeve 55. This latter construction is shown in detail in Figure 4 of my copending application, Serial No. 504,807.

Each of the upper tractor arms 53 is secured at its forward end to a bearing sleeve 57 which is mounted upon the upper pivot bolt 51 which, as previously stated, lies directly above the bolt 50 rearwardly of the beam 28.

Each of the front wheels 36 has secured to the inner side of the backing plate 58 to which the usual wheel spindle, not shown, is attached, by means of bolts 59, the steering knuckle spindle or kingpin unit which is generally designated 60, the position and form of which are clearly illustrated in Figure 5.

This unit 60 comprises the kingpin proper or spindle 61 which is secured by the arms 62 to the backing plate by means of the bolts 59 and maintained at the desired angle to the plane of the backing plate 58. The steering knuckle arm 63 is bolted to the kingpin 61, as shown, and extends inwardly, and as shown in Figure 6, the attachment of the steering knuckle arm to the kingpin is effected by means of an enlargement or block 61a formed integral with the kingpin and having the steering knuckle arm secured to the forward face thereof. This sets the arm 63 slightly forwardly of the axis of the kingpin 61, providing a certain degree of turning radius offset.

Above and below the arm portions 62 of the kingpin are flanges 64 and 65, respectively. The body of the kingpin above the upper flange 64 is in the form of a tapered elongate stem 66, the upper end of which is screw threaded, as indicated at 67.

Below the lower flange 65, the body of the kingpin is reduced to form the short downwardly extending stem 68.

The tapered stem 66 extends through a sleeve 69, the lower end portion of which is formed to provide a bearing housing 70 in which is enclosed a bearing unit, not shown, which rests upon the flange 64. This unit is preferably of the tapered roller type and permits the turning of the kingpin in the sleeve 69 in the manner hereinafter described and for the purpose to be set forth.

Extending inwardly from the sleeve 69 and bearing unit 70 is a bracket embodying a lower arm 71 and an upper arm 72 formed integral with the sleeve 69. The inner ends of these arms are joined by and support a bearing collar 73.

Between the vertically spaced arms 71 and 72, there extends inwardly in parallel relation with the arms from the sleeve 69 a socketed boss 74 in which is secured one end of a stabilizer rod pin 75, the inner end of which pin passes through the bearing collar 73 and supports on its inner end beyond the bearing collar a stabilizer rod joint bearing 76.

The upper and lower ends of the kingpin 61 support the upper and lower camber-caster adjustment units 77 and 78, respectively, which are respectively connected with the adjacent upper and lower wheel tractor arms 53 and 54. One of these units is illustrated in horizontal or axial section and the other in transverse section in Figures 17 and 18. In these figures, the camber-caster unit is generally designated 77, but it will be understood that the construction here is exactly the same in the lower unit 78.

Unit 77 comprises a split collar 79 in which is housed a split internally threaded sleeve 80 and the collar 79 is secured to the adjacent end of the tractor arm in a suitable manner, as shown.

Rotatably supported within the internally threaded split sleeve 80 is an externally threaded eccentric adjustment sleeve 81, the outer end of which is of suitable hexagonal form to facilitate the application of a wrench thereto.

Extending through the sleeve 81 and supported therein by suitable roller bearing is a stub axle 82, the inner end of which is pivotally connected by a bolt 83 with a bearing collar 84 through which extends, at right angles to the bolt 83, the upper end of the tapered stem 66, as shown in Figure 5. This collar rests upon the top of the sleeve 69, as shown, and a nut 85 retains the parts in assembled relation.

As will, of course, be readily apparent, the bearing collar 84 for the lower unit 78 has extended therethrough the downwardly extending stem 68 and the lower end of this stem carries the nut 86 which maintains the lower unit 78 on the lower end of the kingpin lower stem portion 68, as clearly shown.

Each stabilizer rod support pin 75 also functions as a mount for a body support arm which is generally designated 87. Each of these arms 87 is substantially vertically disposed, as shown in Figure 2, and is formed at its lower end to provide a bearing collar 88 having therein a bearing sleeve 89 through which the pin 75 extends, as shown in Figure 5. Each body support arm is bowed in its lower portion, as indicated at 87a, and terminates in a straight upper end portion 87b. The arms are mounted upon their supporting pins 75 so that the bowed lower portion extends rearwardly around and spaced a substantial distance from the upper camber-caster adjustment unit 77.

The upper end of each of the body support arms 87 carries a head portion 90 which is fixed between a pair of plates 91 by means of bolts, rivets, or in any other suitable manner. These plates 91 lie in spaced parallel planes which extend longitudinally of the vehicle structure and between the forward portions of the spaced plates 91 there is mounted upon a pivot pin 92 a cam engaging roller 93.

Rearwardly of the cam engaging roller 93, the spaced plates 91 are connected by a transverse pin 94 with which is connected the forward end portion of the hereinafter described electro-hydraulic spring rate control unit.

At the front end of the chassis structure on each side thereof and located in a vertical plane lying substantially midway between the longitudinal side beam of the chassis and the adjacent wheel is the vehicle body support mechanism which is generally designated M—F and at the rear of the vehicle, in longitudinal alignment with each front mechanism M—F and lying in a plane between the adjacent side beam of the chassis frame and the adjacent rear wheel is a corresponding body support mechanism which is generally designated M—R.

Each of the mechanisms M—F and M—R referred to includes body supporting cams, overload compensating means and the hereinbefore referred electro-hydraulic unit, all of which are of duplicate form or construction, together with the already referred to body supporting arms 87 and corresponding body supporting arms mounted upon the rear axle housing and hereinafter described in detail.

A slight structural difference exists between the body supporting trusses of the front and rear mechanisms, which trusses will now be described.

Figure 3:
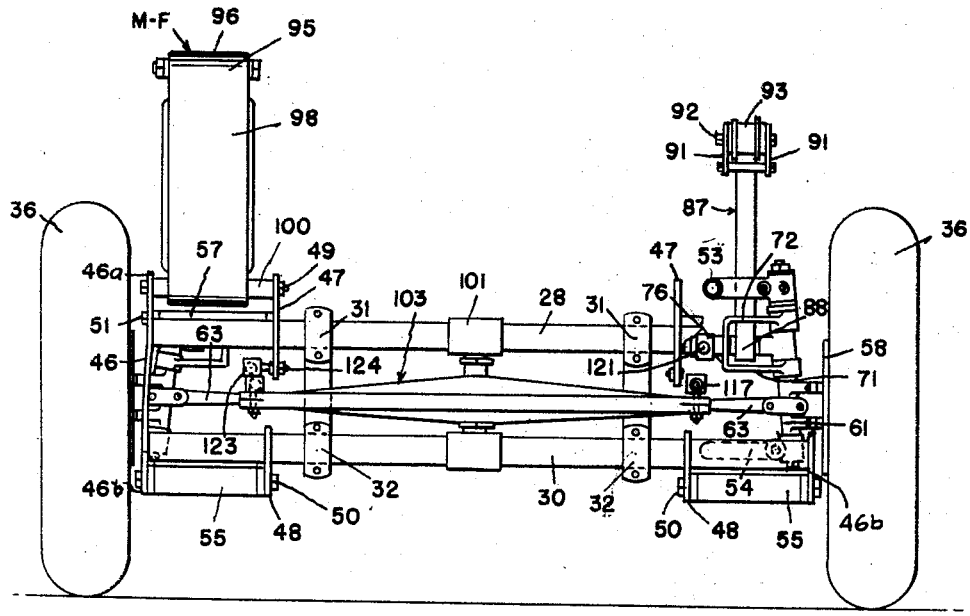
Figure 3 is a view in front elevation of the jointed parallelogram steering structure and showing the left side body supporting truss in front elevation and upon the right side showing the body supporting truss and parts of the suspension mechanism broken away and other parts removed.

Each front body support mechaism M—F embodies a body support truss which is generally designated 95. Each of these front body supporting trusses is in the form of an obtuse angle formed of channel material or in a channel form and having a horizontal top plate 96 and depending longitudinal side flanges 97, with a downwardly and forwardly extending front plate 98 which has the longitudinal edge flanges 99 which are directed rearwardly. This front plate 98 and the side flanges 99 of the angle truss structure forms a leg, the lower end of which is mounted upon the bolt 49 which extends between the top end portion 46a of the adjacent connector plate 46 and the top of the triangular plate 47, as shown in Figure 3. This bolt passes through the flanges 99 and the truss is maintained in proper position thereon against transverse movement by the spacer collars or sleeves 100 encircling the bolt 49.

In addition to supporting the front support mechanism and the tractor arms, the upper and lower body support beams 28 and 30 have connected thereto and support the following steering elements and stabilizing rods.

Secured to the beams 28 and 30 at the center of each or midway between the ends of each is a rearwardly extending bracket plate 101 which are connected by a vertical pin or bolt 102 located in the longitudinal center line of the chassis.

Disposed centrally between the beams 28 and 30 and in parallel relation therewith is the elongate transverse steering member 103 which, in transverse section, is of channel form, having the upper and lower rearwardly extending horizontal flange portions 104 which are joined by the forwardly presented web 105. The channel of the steering member accordingly opens toward the rear, as shown in Figure 6.

Figure 22:
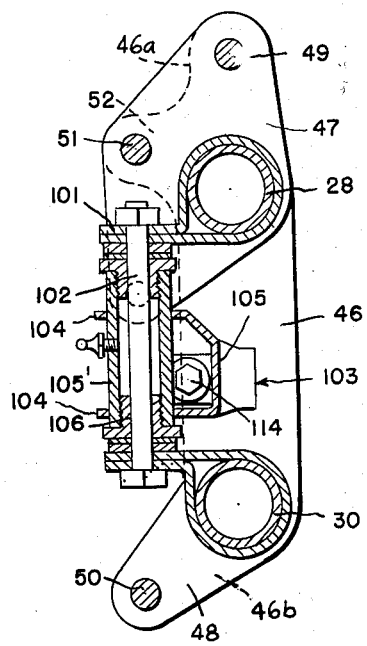
Figure 22 is a section taken substantially on line 22—22 of Figure 1.
Figure 26:
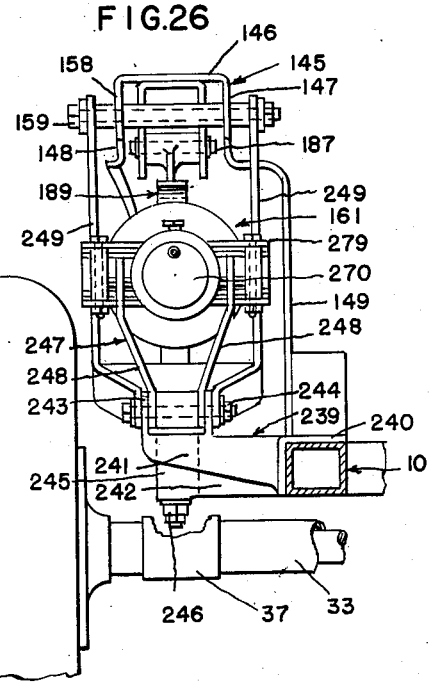
Figure 26 is a sectional view taken substantially on the line 26—26 of Figure 2.
Figure 25:
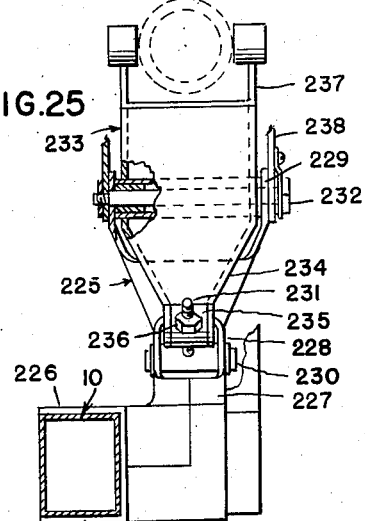
Figure 25 is a sectional view taken substantially on the line 25—25 of Figure 2.

As is also shown in Figures 1 and 6, the flanges 104 of the steering member 103 are of increased width midway between the ends of the member and accordingly, project a substantial distance beyond the vertical plane in which the beams 28 and 30 lie and extending through these portions of the flanges is a vertical sleeve 105' through which the bolt 102 passes and in the ends of the sleeve are bearings 106 which encircle the bolt, as illustrated in Figure 22. Thus, the transverse steering member turns about the axis of the bolt 102 and the outer ends of the member 103 are connected to the steering knuckle or spindle arm 63 by tie rods 107, see Figure 6.

Each tie rod 107 which is constructed to facilitate making wheel alignment adjustments comprises an intermediate portion 108 which may be of tubular form and is internally screw threaded at its ends to receive in one end the threaded stem 109 which is connected by conventional socket member 110 with the ball 111 carried by the arm 63.

At the forward end of the tie rod part 108, a threaded coupler pin is adjustably engaged in the part 108 and has a forward forked end portion 113 which is connected by a horizontal transversely directed pivot bolt 114 with a body 115 which lies in the channeled end of the steering member and is connected thereto by the vertical pivot bolt 116. Thus, a universal coupling is formed between the forward end of the stem 109 and the adjacent end of the transverse steering member, as is clearly shown in Figure 6.

Intermediate its ends, the threaded stem 109 is connected by a conventional ball and socket joint 117 with a drag link stem 118 to which the usual steering mechanism drag link (not shown) is connected.

The numeral 119 generally designates a stabilizer rod located at each side of the chassis frame and each of these rods comprises a central portion 120 which may be of tubular form and internally screw threaded at each end with one threaded end receiving the threaded stem portion 121 of the stabilizer rod joint bearing 76 while the opposite or forward end receives the correspondingly threaded stem 122 which is connected through a ball and socket coupling 123 with a pin 124 secured to the lower end portion of the adjacent triangular plate 47, as best seen in Figure 3.

Each of the posts 38 mounted upon the rear axle housing is connected with the lower end of a rear body support arm which is generally designated 125 in the manner now to be described. Each of these arms corresponds in its function generally to the adjacent front arm 87, and cooperates with a cam mechanism and an electro-hydraulic spring rate control unit, as hereinafter described.

Each rear body support arm 125 embodies an elongate member 126 having a lower obtusely angled terminal portion 127 and a top transverse bearing sleeve 128.

The lower portion 127 of the member 126 has a vertical passage 129 therethrough in which is positioned a threaded bolt 130 which carries upper and lower spacing nuts 131 and 132, respectively, which engage in the adjacent ends of the passage 129 and by means of which the vertical adjustment of the arm upon the bolt is effected. At the upper end of the bolt 130 is a lock nut 133 which bears against the top of the upper adjustment nut 131, as shown in Figure 15.

The lower end of the bolt 130 carries a ball 134 which positions in the socket 39 and is maintained in place by a retainer 135 and overlying this retainer 135 and between the same and the lower spacer nut 132 is a dust cap 136 which encircles the lower end portion of the bolt and covers the retainer cap 135, as shown.

Extending through the bearing sleeve 128 and supported in bearings 137 is a thrust spindle 138 which is directed longitudinally of the vehicle, as is shown in Figure 2.

The forward end of this spindle 138 carries two spaced ears 139 between which is supported a pivot pin or bolt 140. This pivot bolt 140 carries for rotation thereon the flanged thrust roller 141 for engagement with the hereinafter described body support cam.

The rear end of the spindle 138 is screw threaded, as shown in Figure 15, and has threadably positioned or engaged thereon a split collar 142 which is tightened in adjusted position by transverse bolts 143, and this collar is formed integral with a transverse T-head of tubular form and designated 144 in which is mounted a cross-pin 145, as shown in Figure 16.

The rear body support mechanism M—R embodies a rear body support truss which is generally designated 145 and performs the same function as will be hereinafter set forth as the front body support truss 95, but is of slightly different form than the front truss.

Each truss 145 embodies an elongate top plate 146 which is bordered by the inner and outer flange portions 147 and 148, respectively, thereby forming a downwardly opening elongate channel.

Figure 4:
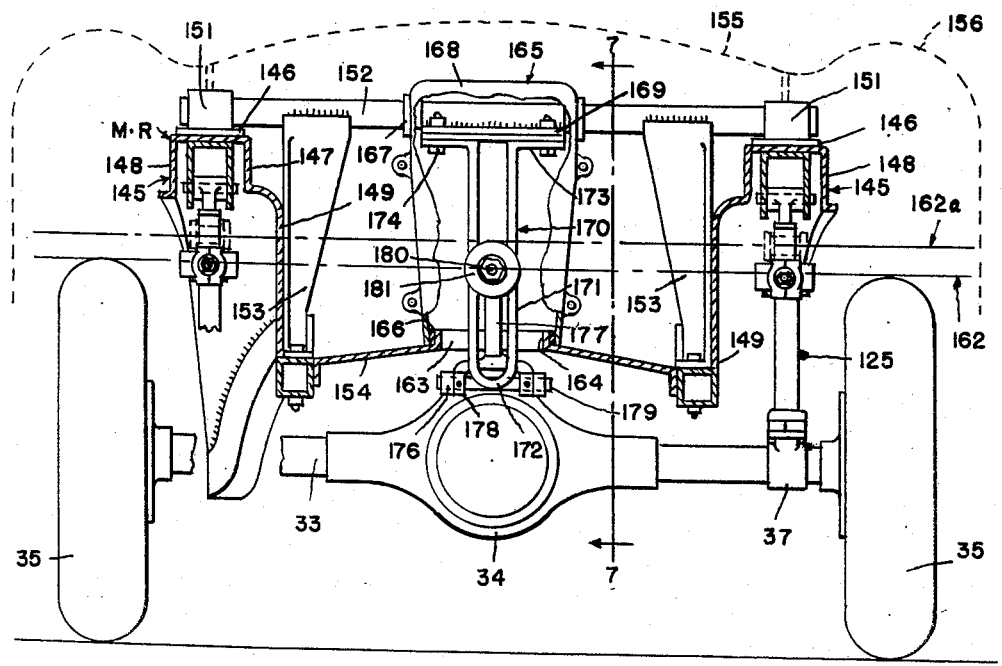
Figure 4 is a transverse sectional view taken substantially on the line 4—4 of Figure 1 and showing in transverse section portions of the body master support truss and the car body floor and the vertical guide means between the body frame and rear axle assembly, the housing for such guide means being broken away.

The inner flange 147 is formed integral with an inset wall plate 149, the bottom edge of which rests upon and is welded to the top of the underlying side beam of the chassis frame, as shown in Figure 4, and the flanges 147 and 148 are connected together by the vertical front plate 150 which, like the front plate 98 of each of the front supports 95, forms a shield for protecting the cams and overload compensating mechanisms housed within and located below the protecting channel formed by the top plate 146 and flanges 147 and 148 in the rear mechanism and the top plate 96 and flanges 97 and 98 of the front trusses.

The top plates 146 of the rear body support trusses have secured thereon the yokes 151 in which are secured the ends of the transverse support bar 152. Beneath this transverse support bar, each side beam of the chassis frame has mounted thereon the upstanding support and brace leg 153, the upper end of which is positioned against the underside of the bar 152 and secured thereto, as shown in Figure 4.

Figure 7:
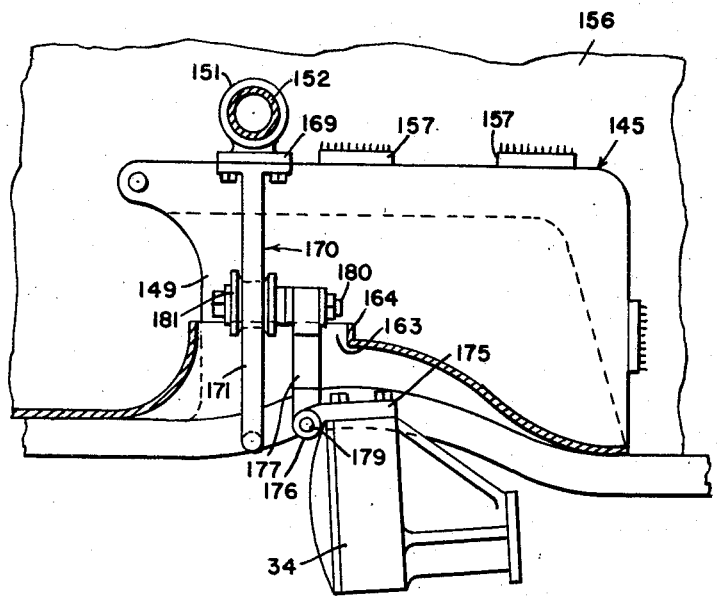
Figure 7 is a vertical section taken substantially on the line 7—7 of Figure 4, with the housing for the vertical guide between the body frame and rear axle assembly removed.

The numeral 154 designates a portion of the car body floor which, as shown in Figure 4, is secured across and between the side beams of the chassis frame, this particular section of the floor constituting the bottom of the vehicle luggage compartment, not shown, but the top part of which is indicated in dotted lines at 155, while at the outer sides thereof, the upper portions of the rear wheel covering fenders are shown in dotted lines and designated 156, as shown more particularly in Figure 7, where there are illustrated attaching ears 157 which are provided upon the top plates 146 to facilitate the welding of the car body or fender side walls to the master body support truss 145.

The flanges 147 and 148 terminate a slight distance rearwardly of the top plate 146, in transversely spaced ears 158 which are connected by a transverse pin 159 for the purpose hereinafter set forth.

Likewise, the depending flanges 87 of the truss top plate 96 forming a part of the front body support truss, terminate in rearwardly extending ears 97a which are connected by the transverse pin 97b for the purpose hereinafter set forth.

Mounted within and beneath the downwardly opening channel portion of each front body support truss 95 and each rear body support truss 145 is a load support cam and overload compensator mechanism which is designated as a whole by the reference numeral 160.

Also associated with each load support and overload compensator mechanism 160 is an electrohydraulic unit which is generally designated 161.

In the longitudinal sectional view forming Fig. 2, the front and rear load support and overload compensator mechanisms are designated respectively 160–F and 160–R and also in this view and in Fig. 1, the front and rear electrohydraulic units are respectively individually designated 161–F and 161–R.

Since each load support and overload compensator mechanism is of the same construction as the others and since each hydroelectric unit 161 is the same construction as each of the others, one of these mechanisms is hereinafter specifically described and one electrohydraulic unit is specifically described with the understanding that the description applies to all four of the mechanisms 160 and to all four of the electrohydraulic units.

Referring now particularly to Fig. 4, the mechanism is illustrated which functions to permit desired up-and-down movement of the body and chassis frame to the underlying running gear and also to permit right or left lateral inclination of the body and chassis frame while at the same time preventing lateral horizontal shifting of the body and chassis frame with respect to the underlying running gear.

In this Fig. 4 the broken lines 162 and 162a designate respectively the normal center of gravity plane for the vehicle and the center of gravity plane when the hydraulic elevating mechanism is in operation to lift the body and chassis frame.

Directly above the rear axle differential housing 34 the floor 154 of the trunk compartment has an opening 163 therein which is defined by an upstanding flange 164.

Between the floor 154 and the transverse support bar 152 lying thereover and extending across and above the opening 163 is a vertical housing 165, the bottom end of which is open to receive the upstanding flange 164 as shown and preferably there is interposed between the open bottom portion of the housing and the flange a resilient collar 166.

The upper part of the housing 165 extends above the support bar 152 and opposite side walls have flanged openings 167 through which the bar 152 passes.

Access to the interior of the housing 165 may be provided for in any suitable manner, as for example, by means of a rear wall door plate 168 which may be bolted or otherwise suitably secured to the housing in closed position.

Within the housing 165 there is secured to the transverse support bar 152 preferably upon the underside thereof and by welding as shown in Fig. 4, a guide supporting plate 169.

The numeral 170 designates an elongate guide having spaced parallel side rails or tracks 171 which are connected together at their lower ends as indicated at 172 while the upper ends are integral with laterally extending arms 173 which position against the underside of the plate 169 to which they are secured by suitable means such as the bolts 174. This guide is preferably formed in one piece or as a unit as shown and is of such length that as to project downwardly through the opening 163 as shown.

As shown in Fig. 7 the major portion of the opening 163 is rearwardly of the differential housing 34 and there is secured to the top of the differential housing 34 a hinge plate 175 which carries the rearwardly projecting transversely spaced hinge ears 176.

The numeral 177 designates an upstanding roller supporting arm, the lower end of which carries laterally spaced hinge ears 178 which lie between the hinge ears 176 and a pivot pin 179 passes through and pivotally supports the upstanding arm 177 for slight rocking movement on the pivot pin 179 as will be readily apparent.

The support arm 177 has mounted in the upper end thereof a rearwardly extending stub shaft 180 on which is rotatably mounted the peripherally grooved roller 181. This roller is engaged between the side rails or tracks 171 of the guide 170 as shown in Figs. 4 and 7 and by this means a coupling is established between the body and frame and the rear axle housing or rear running gear of the vehicle. This coupling permits the vertical movement of the frame and vehicle body and also permits rocking movement of the vehicle body and frame about a central longitudinally extending axis as hereinbefore stated.

*Load support and overload compensation mechanism*

The reference character 160 generally identifies any one of the four load support and overload compensating units or mechanisms since these mechanisms are the same in details of construction whether used at the front or the rear of the vehicle structure. However, to facilitate identification of these mechanisms in the front of the vehicle structure and the same mechanism in the rear of the structure where it may become necessary to distinguish one from the other the reference character 160–F is applied to the mechanism 160 where it is the front of the vehicle, while the reference character 160–R is used for the mechanism 160 where applied to or used at the rear of the vehicle.

Figure 8:
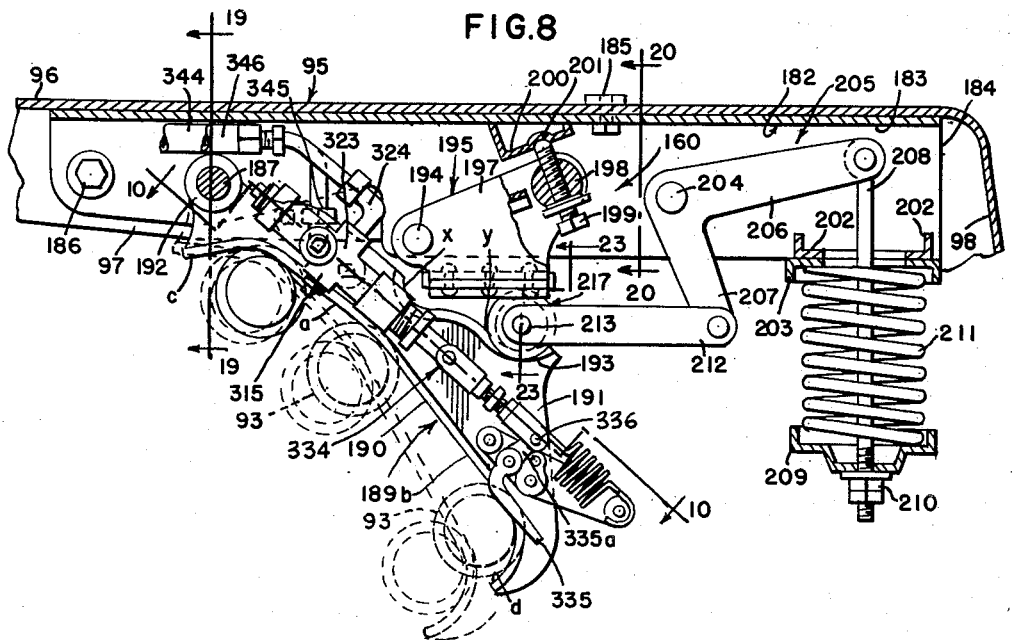
Figure 8 is a vertical longitudinal section through a front master body support truss and illustrating details of the mechanism lying thereunderneath and corresponding to the mechanism shown at the front upper part of Figure 2 on an enlarged scale.

For a general description of the mechanism 160 reference is had particularly to Fig. 8. In this figure, the reference character 182 designates a downwardly opening channel having a top wall or web 183 and side flanges 184.

This channel 182 is secured under and within the body support truss 96 or 145 by means of top bolt 185 and side flange bolts 186. The bolt 185 passes through the supporting truss top plate, while the bolts 186 pass through the side flanges of the supporting truss as will be readily understood upon reference to Figs. 2 and 7 particularly.

Adjacent the rear end of the channel 182 a pivot pin 187 is supported between the side flanges 184 of the channel in bearings 188.

The numeral 189 generally designates an elongate cam body which comprises the long cam plate 190 having a central longitudinally extending back rib 191, the upper end of which is formed integral with the transverse bearing sleeve 192 through which the pin 187 passes.

The cam body 189 is suspended for turning movement or oscillation on the horizontal transversely extending pivot pin 187, with the face of the cam track 190 directed rearwardly and the track extending from the pivot pin forwardly and downwardly. In other words, the cam body is suspended to extend downwardly and forwardly and in operation it has up and down swinging movement on the pivot pin 187 as hereinafter set forth.

The cam track 190 is divided in two longitudinal camming sections designated $a$ and $b$, the section $a$ being at the upper part of the cam track and the section $b$ being of somewhat longer and at the lower portion of the track. At its upper end the cam track terminates in the sharply down-curved section $c$ and at the lower end is a downwardly and rearwardly curving terminal portion $d$.

Approximately midway between its ends the cam rib 191 has formed integral therewith a short cam track which is designated 193 which functions in association with the hereinafter described overload compensation spring and which faces upwardly and forwardly or in the opposite direction from that in which the cam track 190 faces. This short cam track 193 is contoured to form the two spaced dwell areas or depressions $x$ and $y$.

Overlying the upper end of the short cam track 193, there is mounted between the side flanges 184 of the channel 182 a cradle supporting pivot pin 194. This pin 194 supports for pivotal or rocking movement in a vertical plane a substantially U-shaped cradle which is generally designated 195 and which comprises a bottom portion 196 and the upstanding sides or side flanges 197. These side flanges are of greater height at the forward ends than at the rearward ends as shown and the pivot pin 194 passes through the rearward or lower ends thereof and the forward or higher ends of the side flanges 197 have rotatably mounted therebetween a rocker bar 198 provided with a suitable threaded transverse opening substantially midway between its ends through which is threaded the adjustment screw 199.

Above the rocker bar 198, there is fixed to the underside of the top web 183 of the channel 182, a thrust plate 200 in which is formed a downwardly directed depression 201 in which the upper end of the adjustment screw 199 is engaged.

In Fig. 23 there is illustrated lower portion of the cradle 195 showing portions of the side flanges 197 which connect the bottom part 196 of the cradle. In this view, there is also illustrated, secured to the underside of the bottom 196 of the cradle, a wear plate which is generally designated 202a. This wear plate is secured by rivets 203a or in any other suitable manner and has the upturned end flanges 204a which engage across the adjacent ends of the bottom 196 of the cradle and downturned longitudinal side flanges 205a which function as position retainers for the hereinafter described overload roller.

The flanges 184 of the channel member 182, which channel member may be additionally and more specifically defined as the sub-body support truss, are connected at their forward ends, between the bottom edges, by the cross bars 202. Secured to the undersides of these bars 202 is a centrally apertured plate 203 for the purpose about to be described.

Located between the plate 203 and the cradle 195 is a transverse bell crank supporting pin 204 which is mounted at its ends in the flanges 184 and which passes through the angle portion of a bell crank lever which is generally designated 205 and which comprises the long forwardly directed arm 206 and the downwardly extending or directed arm 207.

The forward free end of the arm 206 is pivotally attached to the upper end of the spring support rod 208 which passes downwardly through the apertured plate 203 and carries upon its lower end a spring seat 209 which is in the form of a centrally apertured peripherally flanged disc as shown and the lower end of the support rod 208 is threaded to receive the adjustment nuts 210.

Encircling the rod 208 and supported upon the seat 209 and compressed between the seat and the plate 203, is an overload spring 211.

The short arm 207 of the bell crank has pivotally attached thereto, on opposite sides thereof, the ends of a pair of rearwardly extending links 212 and the opposite or rear ends of these links are connected by a short roller shaft 213 which, as shown in Fig. 23 carries a head 214 on one end and is threaded at the other end to receive the nut 215. Between the head 214 and the adjacent link 212 and between the nut 215 and the adjacent link 212 is a spacer member 216. These spacers may be made as separate parts as illustrated or they may be formed as bosses on the outer sides of the links as may be desired.

The overload cam engaging roller which is supported upon the shaft 213 between the rear ends of the links 212, is designated as a whole by the reference character 217. This roller is comprised of three separate members which are shown as the outer circular discs 218 and the intermediate overload cam engaging sleeve 219. Roller bearings 220 encircle the shaft 213 in the roller discs 218 and encircling the shaft and lying within the cam engaging sleeve 219 are corresponding roller bearings 221 and the sleeve 219 is separated from the adjacent discs 218 by washers 222 while similar washers 223 are interposed between the outer sides of the discs 218 and the adjacent links.

The over-all width of the overload roller 217 is such that it will fit between the downturned flanges 205a of the wear plate 202a and the outer sides of the rollers are beveled as indicated at 218a to conform to the angles of the inner faces of the adjacent wear plate flanges 205a, as shown, so that as the roller moves in its functional action back and forth against the face of the guide or wear plate, it and the links will be held against lateral movement.

In addition to engaging the underface of the body support rail or hardened wear or guide plate 210a, the roller 217 bears, through the medium of the central sleeve portion 219, upon the short cam track 193. As shown in Figure 8, the roller 217 is interposed between the plate 201a and the short cam track, the disk portions 218 being positioned upon the outer sides of the cam track, while the central part of the roller, namely the sleeve 219, rests upon the cam track. The roller 217 may thus move back and forth against the body support rail or wear plate 201a between the latter and the cam track 193, moving from one of the dwell areas to the other, which dwell areas are designated x and y.

The front electrohydraulic units 161-F are each supported on the adjacent side beam of the chassis frame 10 by a mounting bracket which is generally designated 225. This bracket 225 comprises a lower portion 226 which is secured to the chassis frame side beam by welding or in any other suitable manner, and an outwardly offset upstanding portion 227 which is formed to provide the two spaced bearing ears 228 which are at the forward side of the bracket and at an elevation just above the supporting side beam of the frame, and the top terminal transversely spaced upper ears 229.

The lower pair of transversely spaced ears supports between them the pivot pin 230 which has secured centrally between its ends one end of a screw post 231.

The upper ears 229 carry between them the transverse pivot pin 232 and mounted upon this pivot pin between the ears 229, for rocking movement on the pivot pin 232 is a rock plate 233. This rock plate has a lower end portion 234 carrying a transversely apertured pin 235 through which the threaded or screw post 231 freely passes and this post has threaded thereon the nut 236 which engages against the pin 235 to maintain the rock plate in a desired position.

The upper end of the rock plate carries the two upwardly and forwardly curving trunnion arms 237 between which are held, in the manner hereinafter set forth, the rear end portion of the adjacent electrohydraulic unit.

Extending upwardly and forwardly from each end of the pivot pin 232, upon the outer side of the adjacent ear 229, is a body support truss link 238. The upper ends of these links are connected to the ends of the pin 97b which extends across between and connects the ears 97a of the side flanges 97 of the body support truss 95.

The manner in which the rock plate 233 and the supporting mounting bracket 225 support the rear end of the electrohydraulic unit 161 will be hereinafter described.

Each of the side beams of the chassis frame supports and has secured thereto a substantial distance rearwardly of the rear axle housing, a rear mounting bracket 239 corresponding to the front brackets 225 and functioning to support the rear end of a rear electrohydraulic unit 161-R. Each of these rear mounting brackets comprises a base plate portion 240 which is welded to the side beam of the chassis frame and has an outwardly extending arm 241 and a second outwardly and forwardly extending arm 242.

The outwardly extending arm 241 carries the two spaced upright ears 243 between which is mounted a pivot pin 244.

The arm 242 is formed with a vertical guide sleeve 245 through which extends the vertically adjustable post 245a, to the upper end of which is connected at 246 one end of a rock member 247 corresponding to the rock plate 233. This rock member 247 is pivotally supported between its ends by and between the ears 243 upon the pivot pin 244.

Above the pivot support 244 for the rock member, the latter is formed to provide the upwardly and forwardly curving transversely spaced trunnion arms 148 which function in the same manner as the arms 237 in supporting the rear end of the adjacent electrohydraulic unit 161-R, as hereinafter will become apparent.

Connected with each end of the pivot pin 244 upon the outer side of the adjacent ear 243, and extending upwardly and forwardly is a rear body support truss link 249, and the upper ends of these links are pivotally connected to the pin 159 which extends across between the rearwardly directed ears 158 of the rear body support truss 145.

*Electrohydraulic units*

Figure 12:
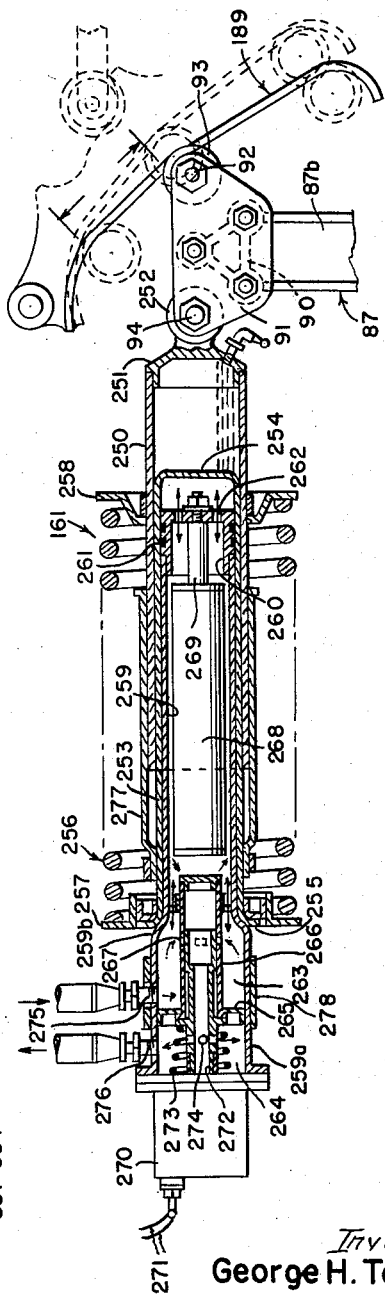
Figure 12 is a longitudinal section taken in a vertical plane through a front hydraulic support unit showing internal structural details and showing the connection between the support unit and the adjacent front support cam.
Figure 21:
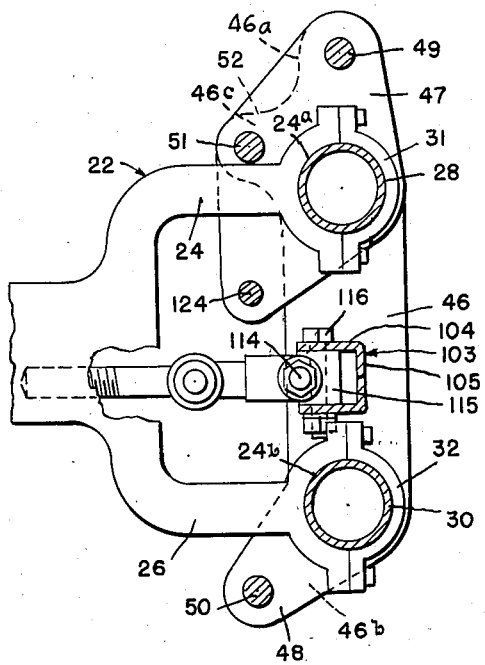
Figure 21 is a section taken substantially on the line 21—21 of Figure 1.

Referring now to Figures 12 and 16 particularly, the structure of each of the four electrohydraulic units is illustrated, which units are connected in the fluid and electrical systems by which the elevation of the body and chassis on the running gear is effected and also the manually controlled or automatic lowering of the body on one side or the other is effected to maintain a level condition of the body as the vehicle moves around a curved path.

As will be seen upon reference to the two Figures 12 and 16, each of the electrohydraulic units together with the master spring associated therewith is generally designated 161, and each comprises an elongate tubular cam track follower sleeve 250 which has a forward end which is closed by a head 251.

In the electrohydraulic unit 161 shown in Figure 12, the head 251 is designed for connection between the plates 91 which are secured to and supported upon the upper end of the front body support arm 87. This means of attaching the head between the plates 91 comprises a transverse sleeve 252 carried by the head and adapted to be positioned between the plates 91 and have the pin 94 passed therethrough.

In the electrohydraulic unit 161 which is connected with a rear body support arm 125 through the medium of the split collar 142, the head 251 carries two spaced ears 252′ between which the tubular T-head 144 positions, as shown in Figure 16, and these ears receive the ends of the cross-pin 145, thereby providing a pivotal coupling with the support arm 125, as will be readily apparent.

With the exception of the manner of connecting the heads 251 with the respective support arms, the electrohydraulic units are of the same form or construction at all four of the positions at which they are used.

The sleeve 250 receives in its open rearwardly directed end the tubular piston cylinder 253, the forward end of which is closed by the head 254, while the rear end is encircled by the outwardly extending flange 255 which forms a holding means for the rear end of the master suspension spring, which is generally designated 256. This flange 255 is of smaller over-all diameter than the inside diameter of the master spring, so that the latter can be slipped thereover, and there is then secured to the flange 255 the flange extension or collar 257 against which the rear end of the master spring presses or abuts, as shown.

For holding the forward end of the master spring 256, the sleeve 250 has fitted thereon the encircling thrust collar 258 against the rear face of which the forward end of the spring presses, as shown.

The numeral 259 designates the piston which carries the head 260 in its forward end which carries the encircling piston rings 261 which bear against the inner surface of the cylinder 253 in which the forward end of the piston positions.

The piston is hollow, as shown, and the forward end of the head has fluid passing ports 262 to permit fluid to pass from the interior of the hollow piston into the cylinder and back in the operation of the unit as will be hereinafter apparent.

A portion of the hollow piston at the rear end is of enlarged diameter, as indicated at 259a, and where the larger rear end portion merges with the smaller and longer forward end portion, there is formed the shoulder 259b which forms a stop which is engaged by the flange 255 to limit the rearward movement of the piston cylinder on the piston.

The enlarged rear end portion 259a of the piston is divided into a forward and rearward fluid chamber 263 and 264, respectively, by the annular flange 265 carried by the rear end of a forwardly extending valve sleeve 266, the forward end of which is closed while the wall of the sleeve is provided with fluid escape ports 267.

The forward fluid chamber 263 is in direct communication with the interior of the hollow piston 259, as shown, and the major portion of the hollow piston has disposed therein the elongate hollow fluid displacement body 268 which is detachably connected with the head 260 of the piston by the stem 269, as shown in Figure 12.

The numeral 270 generally designates an electric solenoid unit, the wires for which are indicated at 271.

No interior construction of this unit is illustrated, as such unit is of standard form embodying a wire coil and a reciprocating solenoid core which is drawn inwardly upon energization of the unit.

The solenoid unit 270 is fixed to and closes the rear end of the hollow piston, and there is fixed to the solenoid core to extend forwardly through a suitable fluid-tight gasket (not shown) a tubular valve stem 272 which is slidable in the valve sleeve, as shown, and is open at its forward end. This tubular valve stem is constantly urged forwardly by the spring 273 to a position where the open forward end of the stem covers and closes the exhaust ports 267.

In its rear end portion, the tubular valve stem has outlet ports which are constantly in communication with the rearward fluid chamber 254, which ports are designated 274.

The wall of the enlarged rear end portion of the piston has fixed therein fluid inlet and fluid outlet nipples 275 and 276, respectively, which respectively communicate with the forward and rearward fluid chambers 263 and 264. These nipples are connected with fluid pressure lines of the hydraulic system about to be described.

It will be seen from the foregoing description that when the solenoid unit 270 is energized, the tubular valve stem 272 will be drawn rearwardly so that the open forward end will uncover the outlet ports 267 and fluid, when under pressure in the forward chamber 263, may then flow through the tubular stem to the ports 274 and into the chamber 264 and pass out by way of the nipple 276.

As a protective means for the rear end portion of the tubular cam track follower sleeve 250, there may be provided a jacket 277, shown only in Figure 12, which is fixed around the rear end portion of the piston cylinder and is of a diameter to snugly receive through its open forward end the sleeve 250. In the forward and rearward movements of the piston cylinder, the jacket will slide over the rear end portion of the sleeve 250.

The enlarged rear end portion of the hollow piston is encircled by a wide collar 278 and from opposite sides of this collar, there extend in opposite directions the rearwardly opening trunnion arm seats 279. In the front electrohydraulic units 161–F, these arm seats 279 receive the forwardly directed ends of the trunnion arms 237 and in the rearward electrohydraulic units 161–R, these seats receive the forwardly directed ends of the trunnion arms 248, as shown in Figure 2. By these means, the rear ends of the electrohydraulic units are supported upon the underlying side beam of the chasis frame, as is shown in Figure 2, the units extending horizontally forwardly for connection with their respective body support arms 87 and 125.

*Hydraulic system*

Figure 11:
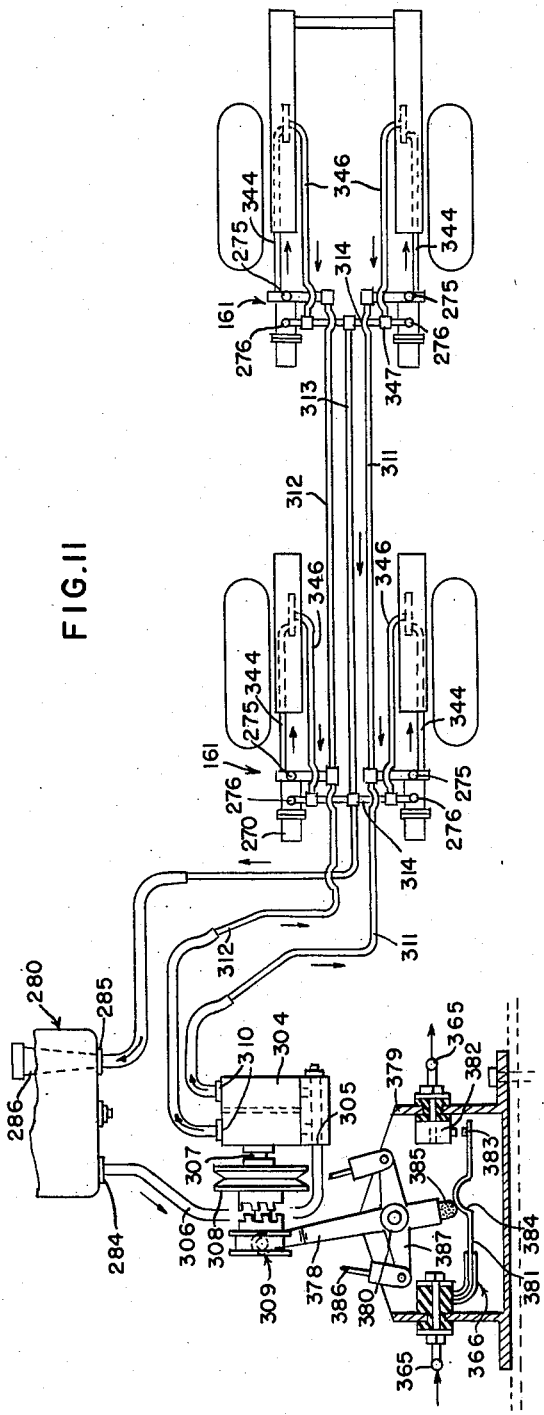
Figure 11 is a diagrammatic view of the hydraulic system and showing details of the hydraulic pump actuated switch.

Figure 11 generally illustrates diagrammatically the hydraulic system in which the cylinders of the hydroelectric units are connected, and Figures 9, 10, 13 and 14 illustrate parts which form a portion of this system.

Means is provided for selectively supplying fluid under pressure to the hollow pistons 259 of the units 161 when it is desired to elevate the vehicle body, the spring suspension units or hydroelectric units including the master suspension springs and the chassis frame above the normal center of gravity, and the hydraulic system includes means for utilizing the warmth of the water in the vehicle motor cooling system for keeping the fluid in the hydraulic system at a desired temperature or for preventing such fluid from flowing sluggishly in cold weather.

In the hydraulic system, the numeral 280 generally designates the hydraulic fluid reservoir which may be secured by suitable clamping support 281 in any suitable location beneath the motor vehicle hood.

The reservoir is illustrated in Figure 14 as being in the form of a vertically disposed cylinder wherein the numeral 282 designates the body and the numeral 283 designates the top or lid. The bottom of the reservoir body has a fluid outlet nipple 284 and a fluid inlet nipple 285, and within the body, the inlet nipple is connected with an upwardly directed nozzle 286 which, as shown, is of gradually increasing diameter from the lower end to the open top, and which expanding nozzle functions to suppress turbulence in the fluid as it flows into the reservoir from the fluid return line of the system.

Within the reservoir body is the fluid heating coil 287, one end of which is connected by the coupling nut 288 with an end of an elbow coupling 289 which is passed through the top 283, as shown, and has its other end located exteriorly of the reservoir body for the connection therewith of a pipe 290 the other end of which is connected, as shown in Figure 13, with a fitting 291 which has one end in communication with the engine water jacket through the engine head block 292, while the other end of such fitting has connection with the vehicle radiator. This fitting 291 between the connection 291a which leads to the engine radiator and the end which leads into the head block 292 is provided with a conventional thermostatic valve 293, which is shown in dotted outline, and between this valve and the engine head block, the other end of the pipe 290 connects into the fitting 291 to receive therefrom water from the engine water jacket.

The other end of the heating coil 287 is connected by the coupling 294 with one end of an elbow fitting 295 which passes through the top 283 of the reservoir, and the other end of this fitting is connected by the pipe 296 with the intake side of the water circulating pump 297, as indicated at 298, which pump draws water from the motor vehicle radiator, not shown, through the intake end of the fitting 299 and discharges it into the water jacket of the motor cylinder block 300 in the well known manner.

The flow of fluid through the pipe 296 is controlled by the manual shut-off valve 301 which is here shown as forming a part of the elbow coupling 295, in Figure 14.

The numeral 302 designates a filling nozzle for the receptacle, and the numeral 303 designates an air vent for the same.

The numeral 304 generally designates a double impeller pump, the intake 305 of which is connected by the pipe 306 with the outlet nipple 284 of the reservoir.

The numeral 307 designates the operating shaft for the hydraulic pump 304 and this shaft 307 carries a pulley 308 by which it may be connected with the motor fan pulley, whereby the fluid pumping motor 304 may be operated by and simultaneously with the vehicle motor.

The numeral 309 generally designates a clutch unit of conventional design, wherein when the teeth are engaged, the hydraulic fluid motor 304 will be driven, and when the teeth of the clutch unit are disengaged, the pulley 308 will turn freely or idle without operating the pump 304.

The means for actuating this clutch unit 309 will be described hereinafter in association with the description of the electrical system in which the solenoid units 270 of the hydroelectric units are connected.

The hydraulic fluid motor has the two fluid outlet couplings 310. From one of these couplings, there leads the fluid outflow pipe 311 and from the other coupling is a corresponding fluid outflow pipe 312. Each of these outflow pipes 311 and 312 serves two electrohydraulic units 161 on one side of the vehicle, as, for example, the pipe 311 may serve the two electrohydraulic units 161 on the right hand side of the vehicle, and the pipe 312 may serve the two units 161 on the left side of the vehicle.

The numeral 313 designates the inflow or return flow pipe which carries fluid discharged from the electrohydraulic units back to the inlet nipple 285 to discharge the fluid into the reservoir 280. This inflow pipe 313, as shown in Figure 11, is connected with the two transverse collecting lines or pipes 314 which connect with the outflow nipples 276 of the electrohydraulic units.

When the clutch 309 is engaged and the hydraulic fluid pump 304 is operating, fluid will be pumped out through the lines 311 and 312 into the forward fluid chambers 263 of the four electrohydraulic units 161. The solenoid operated valves of the units will be closed, and accordingly, the fluid will be forced into the hollow piston and will flow therefrom through the outlet ports 262 in the head end of the piston into the piston cylinder 253.

The pistons 259 being held against rearward movement by the fulcrum arms 237 and 248, the piston cylinder will be forced forward. This will impose pressure upon the springs 256 which will force the tubular cam track follower sleeves forwardly, imposing pressure upon the cam bodies 189 and forcing the cam engaging rollers toward the lower ends of the cams and also at the same time elevating the vehicle body.

The forward position of the cam track follower sleeves is as illustrated in Figure 16.

In order to avoid the possibility of forcing the cam follower rollers off the lower ends of the cams, such lower ends are sharply curved, as indicated at $d$ in Figure 8. Also, a safety fluid pressure release mechanism is provided which will be actuated by the cam follower roller, as shown in Figure 8, which safety mechanism is as follows:

*Fluid pressure release safety mechanism*

Figures 8, 9 and 10 show the fluid pressure release mechanism which is mounted upon each of the cam bodies 189 and which mechanism is designated as a whole by the reference character 315.

The rib 191 of the cam 190 has formed therethrough the two longitudinally spaced openings 316 and 317. The opening 316 is at the upper end of the cam and fixed to the outer side of the rib by bolts or screws 318 is a mounting plate 319 which carries a valve unit 320 which comprises an elongate tubular housing 321 and the laterally extending tubular arm 322 which is integral with the mounting plate 319 and has its free end extended through the opening 316, as shown in Figure 10.

Also formed integral with the housing 322 is the transverse arm 323, shown in Figure 8, in which is connected an end of a coupling nipple 324.

The housing 321 has a longitudinal bore 325 therein which, at its upper end, is closed by the plug 326, while the lower end is of slightly enlarged diameter, as shown, to receive a packing gland 327 and the gland nut 328.

The transverse arm 323 has a fluid passage 329 by which communication is established between the bore 325 and the coupling nipple 324, and the lateral tubular arm has the fluid passage 330 which also communicates with the bore 325 in close proximity to the passage 329, whereby these two passages 329 and 330 may be put into communication one with the other through the intervening portion of the bore 325 by means of the reciprocable valve stem 331.

The valve stem 331 has a portion of its length adjacent to its inner end, reduced in diameter to form the channel 332 and communicating with this channel and extending to the adjacent inner end is the longitudinal surface groove or slot 333 which prevents fluid from becoming trapped and compressed between the inner end of the stem 331 and the plug 326 when the stem is moved forwardly to valve open position.

As shown in Figure 10, the channel 332 which encircles the valve stem is of sufficient length that when the valve stem is pushed forwardly to open the valve, the channel will bridge the space between the passages 329 and 330 so as to permit fluid entering the valve through the passage 330 to pass out through the passage 329 to the nipple 324, shown in Figure 8.

The outer end of the valve stem 331 passes through the packing gland 327 and is pivotally connected by the longitudinally adjustable linkage 334 with the elongate trigger finger 335 which is pivotally connected by means of the pivot pin 336 with the outer end of the linkage unit 334. This trigger finger is also attached to a pivot bolt 337 which is mounted in and extends through the bearing sleeve 338. This bearing sleeve passes through the opening 317 and is joined integral with or connected to the mounting plate 339 which is secured to the side of the rib 191 by the bolts or screws 340.

The plate 339 is continued rearwardly beyond the adjacent end of the cam, to provide the mounting ear 340'. This ear at its rear or outer end has secured thereto the laterally projecting pin 341 to which is attached one end of a contractile spring 342, the other end of which spring is attached, as indicated at 343, to the pivot pin 336 or to any other suitable part of the adjacent end of the linkage 334 so as to constantly tend to pull the valve stem 331 outwardly to valve closed position.

As shown in Figure 8, the under edge of the valve stem actuating finger 335 lies adjacent to the side edge of the cam track 190 and projects slightly beyond the surface of the track. This projecting edge of the finger 335 is in the path of the roller 93 which is flanged at opposite sides, as shown in Figure 10, so that one of the flanges, in line with which the finger 335 lies, will engage the finger when the roller has moved to the limit of its outward passage along the cam track and cause the finger to oscillate and thus apply thrust by means of the upwardly extending ear portion 335a thereof which is connected by the pin 336 to the linkage 334, to the valve stem 331 to force the same forwardly to the valve open position. When the valve stem is so pushed forwardly, the spring 342 will be placed under stronger tension so that upon release of the finger by the roller 93, the spring can return the valve stem to closed position.

Connected with the pipe conveying fluid under pressure to the inlet port 275, by a suitable coupling, as shown in Figure 9, is one end of a pipe 344, the other end of which is connected by means of a coupling 345 with the free end of the tubular arm 322 for communication with the passage 330.

The nipple or coupling 324 which is connected with the outlet passage 329 of the valve 320 has connected therewith one end of a fluid exhaust pipe 346 by which the fluid is carried out from the valve and the other end of this pipe 346 is connected by a suitable coupling, as indicated at 347, with the adjacent pipe 314 which is in turn connected with the common fluid return pipe 313 which leads back to the reservoir 280.

It will be seen from the foregoing that when the piston cylinders and sleeves of the electrohydraulic units are extended, as shown in Figure 16, and the rollers 93 of the forward units or the rollers 141 of the rearward units engage and oscillate the valve trigger finger 335, the finger will oscillate and the valve 331 will be moved to a position where the passages 329 and 330 will be put in communication, and thus the fluid being pumped to the units will be caused to by-pass the units and return to the reservoir.

When the units are under pressure of fluid, as shown in Figure 16, and the pair of solenoid valve units 270 associated with either conjointly operating electrohydraulic units upon one side of the vehicle or the other are energized, the tubular valve stems 272 of the energized solenoid units will be drawn rearwardly to establish communication between the chambers 263 and 264 so that the fluid under pressure in the piston cylinders will be drained off and the incoming fluid entering through the ports 275 will also pass off to the exhaust ports 276. This will bring about a lowering of the side of the vehicle body upon which are located the electrohydraulic units which have had the solenoid valve operating means 270 energized.

The energization of the solenoid units on one side or the other of the vehicle may be effected automatically by side sway or tilting of the vehicle body as the vehicle rounds a curve, or such energization of the solenoid units may be selectively effected manually simultaneously with the operation of the conventional turn signal means.

In my prior application, Serial No. 504,807, there is illustrated the mechanism associated or connected with the turn signal indicating control lever by which the manual energization of the electric solenoid units may be brought about when the vehicle turn signal is energized to indicate a right or left turn, and there is also shown the electrical circuit and inertia operated means whereby the swaying of the vehicle may be caused to automatically energize the solenoid units. Such mechanism and electrical circuit means is shown in Figure 24, and to this electric circuit, there is added a switch which is opened and closed by the operation of the steering wheel post carried manual means provided for engaging and disengaging the clutch 309. By this last mentioned manual means, when the clutch 309 is disengaged, as shown in Figure 11, the electric circuit in which the solenoid units are connected is unprepared for operation by or cannot be operated by the inertia controlled switches but when the manual means for engaging the clutch 309 is actuated to set the hydraulic pump 304 in operation whereby the hydroelectric units are filled with fluid under pressure and the vehicle body is elevated, the electric circuit is prepared so that the solenoid units upon one side of the vehicle or upon the other side may be energized in response to tipping or side sway of the vehicle to bring about a lowering of the side which is elevated by the centrifugal force which tends to raise it when the vehicle is rounding a curve or turn.

Referring particularly to Figure 24, the numeral 348 generally designates the vehicle steering wheel by which the steering shaft 349 is turned, which shaft is enclosed in a conventional housing 350.

The numeral 351 designates the turn signal switch operating shaft which passes downwardly through the steering shaft housing 350 to the turn signal switch mechanism which is diagrammatically shown and generally designated 352.

The numeral 353 generally designates the circuit in which the solenoid valves 270 are connected. For the manual control of this circuit, there is provided the switch 354 which is operated simultaneously with the operation of the vehicle turn signal by the extended portion 351a of the shaft 351.

A source of electric current 355 supplies the current through the conductor 356 to an arcuate terminal plate 357 forming a part of the switch 354, and a rotary switch blade 358 connected with and operated by the shaft extension 351a conducts current from the terminal plate 357 to a center supply terminal 359.

Also forming a part of the switch 354 are the two terminals 360 spaced on either side of terminal 359 and positioned to be selectively engaged by one arm of the switch blade 358 while the other arm is in electrical contact with the plate 357.

The numeral 361 designates the pendulum operated inertia switch which comprises the switch arm 362 having a pivot terminal 363 with which is connected a suitable pendulum weight 364 for oscillating the arm. This switch 361 is mounted on the vehicle in a suitable location where the pendulum will be caused to swing transversely of the line of movement of the vehicle upon the tilting or tipping of the vehicle body for any reason and when such tipping or tilting occurs the switch 361 will function to transmit electric current to the solenoid valves upon one side of the vehicle or the other.

The pivot terminal 363 of the inertia switch is connected by the conductor 365 through a switch, when the latter is closed, with the arcuate contact plate 357. This switch 366 is operatively coupled with the operating means for the clutch 309 and is turned on and off with the engagement and disengagement respectively of the clutch for the operation of the hydraulic pump 304, as hereinafter described.

One of the switch terminals 360 has a conductor or lead 367 connected therewith which is electrically connected to a terminal 368 and the other switch terminal 360 has a conductor 369 connected therewith which is connected to a terminal 370.

The inertia controlled switch arm 362 carries the two movable contact points 371 and 372 which are respectively positioned adjacent to the terminals 368 and 370 for engagement with the latter upon the proper oscillation of the arm 362.

The electrical connections with the solenoids 270 are such that when the inertia switch pendulum swings to the right side of the vehicle, for example, the solenoids on the left hand side of the vehicle will be energized and when the inertia switch pendulum swings toward the left side the solenoids for the control valves on the right side of the vehicle will be energized. Accordingly, it will be seen from the diagram in Figure 24 that the two solenoids 270 on the left side are connected electrically to the conductor 373 which connects with the conductor 369 on the side of the circuit which will be closed upon the bringing together of the contacts 370 and 372 while the solenoids on the right side of the vehicle are connected by the conductor 374 in the circuit which will be closed upon the bringing together of the contacts 368 and 371.

A corresponding energization of the pairs of solenoids 270 on the two sides of the vehicle will also be brought about upon the rotation of the turn signal switch operating shaft 351 to one of its two positions by which to indicate a right or left turn. For example, the setting of the turn signal to indicate a right turn will operate the switch 354, when the switch 366 is closed, to energize the solenoids 270 on the right hand of the vehicle since this side of the vehicle will be the one to rise upon the making of the right turn and obviously upon the setting of the turn signal for the making of the left turn where, during the turn, the side of the vehicle on the inside of the curve or the left side will rise, the solenoids 270 on the left side of the vehicle will be energized to bring about a lowering of this side. This system and its operation have been fully illustrated and described in my prior application Serial No. 432,356, filed May 26, 1954 wherein also the details of the inertia switch are illustrated and described.

The hand lever 375 for operating the turn signal shaft 351 and the shaft extension 351a, by which the current distributing switch 354 is actuated, has mechanism associated with it, in the form of a shiftable sleeve 376 and a cam track 377, which is connected with the steering wheel 348 to turn therewith whereby when the slide 376 is in a set position and the hand lever 375 is turned for indicating a right or left hand turn of the vehicle by the signalling means 352, the lever 375 will be automatically returned to its initial or neutral position. This mechanism has all been fully illustrated and described in my prior application Serial No. 504,807, filed April 29, 1955 and accordingly it is not believed that a detailed description and operation of the same is required in this application other than to set forth the following explanation of the operation involved.

When the slide or friction sleeve 376 is moved to its inward position in which it is shown in full lines in Figure 24, to actuate the directional signal lever, the subsequently occurring action is as follows.

The steering wheel turning movement to the extent of approximately 30° from each side of a neutral or zero position may take place without cutting out of operation the automatic electric distributor or inertia switch 361 and accordingly during this movement this inertia switch controls the transverse level state of the car body when the latter has been elevated by the electrohydraulic units into which the hydraulic fluid has been forced under pressure. However, when the steering wheel is moved, or turned, to the right or to the left more than 30° then the cam track 377 functions to kick the signal lever to a signalling position and when this occurs the automatic current distributor or inertia switch 361 is cut out of service and the switch blade 358 is turned to a position where it disengages the terminal 359 and establishes an electric current conducting path between the arcuate contact plate 357 and one of the terminals 360, to effect energization of a pair of the solenoids 270 controlling the corresponding pair of electro-hydraulic units 161 on one side of the vehicle.

The cam track 377 also embodies in two locations beyond the part of the cam which kicks the signal lever to signalling position, a camming portion referred to as a kick-back indenture and after the steering wheel has been turned in one direction beyond such indenture and is then reversely turned the friction between the cam track and the slide member 376 will urge return of the lever to its zero position but if such friction should be insufficient the engagement of the slide 376 in the indenture provides an additional means of reversely moving the lever.

As previously stated all of the foregoing has been described and details of the construction involved have been set forth in the prior application referred to and it is not believed that a more detailed illustration and description in the present case is required.

In my prior application Serial No. 504,807, filed April 29, 1955 there is also illustrated mechanism supported upon the steering wheel shaft housing for transmitting push and pull movements to flexible cables to effect the engagement and disengagement of the hydraulic pump clutch. This or any other suitable mechanism arranged in a position convenient to the operator of the vehicle may be employed for effecting the oscillation of the clutch fork 378, shown in Figure 11 for actuating the clutch 309.

The clutch fork 378 of the present mechanism also functions to open and close the switch 366 as hereinbefore stated and in the following manner.

A suitable housing is provided for the switch 366, which is here generally designated 379 and a pivot shaft or pin 380 is provided on which the clutch fork 378 is mounted for oscillation above the switch 366.

The switch includes the blade 381 and the fixed and movable terminals 382 and 383, the latter being carried by the blade 381 as shown beneath the fixed terminal 382.

Intermediate its ends the switch blade 381 carries or is provided with an upstanding cam lug 384 and an insulation thrust finger 385 extends downwardly from the clutch fork in position to engage the cam lug 384 as the clutch fork is oscillated in one direction to depress the blade 381 and separate the contacts 382 and 383.

Bowden wires 386 are connected with oppositely extending arms 387 connected with the clutch fork 378 whereby when such wires are actuated by pulling upon one and pressing upon the other the clutch fork will be oscillated in the desired direction to engage or disengage the clutch 309.

When the clutch is engaged the hydraulic fluid pump 304 will be operated by the motor vehicle engine so that the fluid will be transmitted under pressure into the electrohydraulic units and the piston cylinders and sleeves of such units will be forced forwardly to impose pressure against the adjacent master cams to effect the elevation of the vehicle body. Under such conditions the switch 366 must be closed so that the inertia switch 361 may function in the manner previously stated to energize the necessary solenoids 270.

I claim:

1. In a motor vehicle, a chassis frame, rear wheel running gear, resilient suspension means between said gear and the frame, steerable front wheels, mechanism operatively coupling the front wheels with the chassis for vertical swinging movement about an axis extending transversely of the chassis and for steering turning movement about substantially vertical spindles, and suspension means between each of said spindles and the frame embodying an upright arm supported by and upon the inner side of the spindle, a horizontally disposed coil compression spring extending longitudinally of the chassis frame, means connecting the rear end of the spring to the chassis frame, and a cam and follower mechanism operatively connecting the top end of the arm and the forward end of the spring with the chassis frame whereby variable compressive thrusts will be applied to the spring by the vertical swinging of the wheel about said transverse axis.

2. In a motor vehicle, a chassis frame, rear wheel running gear, resilient suspension means between said gear and the frame, steerable front wheels, mechanism operatively coupling the front wheels with the chassis for vertical swinging movement and for steering turning movement about substantially vertical spindles, and suspension means between each of said spindles and the chassis frame embodying a coil compression spring horizontally disposed and directed longitudinally of the chassis frame, a mounting for the rear end of the spring on the chassis frame, means including a cam and follower coupling the forward end of the spring with the chassis and an expansible power unit means operable longitudinally of the spring for effecting through said cam and follower the elevation of the chassis relative to the adjacent wheels.

3. In a motor vehicle, a body supporting chassis frame, rear wheel running gear, steerable front wheels, an operative coupling mechanism between said front wheels and the chassis by which vertical swinging of the front wheels on a common axis extending across the chassis is permitted and whereby steering turning of the front wheels about substantially vertical spindles may be effected, a spring suspension means adjacent to each rear wheel embodying a horizontal longitudinally disposed coil compression spring, an upright arm supported by the rear wheel running gear and having the forward end of the spring flexibly coupled to the upper end thereof, a mounting for the rear end of the compression spring on the chassis, a movable coupling between said top of the arm and the chassis, and a spring suspension means adjacent to each front wheel embodying a horizontal longitudinally disposed coil compression spring, an upright arm supported by and upon the respective spindle, an operative coupling between the forward end of the last mentioned spring and the upper end of the last mentioned arm, means forming a movable coupling between said operative coupling and the chassis substantially above the spindle of the adjacent wheel, and means supporting the rear end of the last mentioned spring from the chassis.

4. In a motor vehicle, a body supporting chassis frame, rear wheel running gear, steerable front wheels disposed rearwardly of the forward end of the chassis frame, a trailing parallelogram structure coupling the front end of the chassis frame with each of the front wheels and constructed to permit vertical swinging of the front wheels on a common transverse axis, a vertical front member supported by each front wheel, a vertical rear member supported on the rear wheel running gear behind each front member, a spring suspension means rearwardly of each rear member and embodying a horizontal longitudinally disposed coil compression spring interposed between the chassis frame and the adjacent rear member, and a spring suspension means rearwardly of each of said front members and embodying a horizontal longitudinally disposed coil compression spring interposed between and operatively coupled to the adjacent front member and the chassis frame, a load carrying cam supported by the chassis frame forwardly of each front and rear member, and a follower supported by each front and rear member and bearing against the adjacent cam, said front and rear members being supported for a prescribed movement in response to load imposed on the followers by the cams.

5. The invention according to claim 4, wherein said cams are supported for swinging movement in the direction of compression and expansion movements of the springs, and means for securing the cams in a selected downwardly and forwardly inclined position of adjustment.

6. In a motor vehicle, a body supporting chassis frame, rear wheel running gear, spring suspension means between the chassis frame and said running gear, steerable front wheel units disposed rearwardly of the front end of the chassis frame, trailing vertically spaced arm members coupling each front wheel unit with the front end of the chassis frame, said arms being pivotally mounted at their ends to permit the front wheel units to swing vertically on common transverse axes, a vertical body support member mounted upon each front wheel unit to swing in a vertical plane extending longitudinally of the chassis, a spring suspension means located rearwardly of each body support member and embodying a horizontal longitudinally disposed coil compression spring, means supporting the rearward end of each suspension means on the chassis frame, a coupling between the forward end of each suspension means and the adjacent body support member, an elongate downwardly and forwardly inclined cam track supported by the chassis forwardly of each body support member, and a follower connected with the forward end of each suspension means and the adjacent support member and bearing upon the adjacent inclined cam track.

7. The invention according to claim 6 wherein the said rearward end of the suspension means has engagement with its supporting means permitting rocking of the suspension means in a vertical plane whereby the forward end may move up and down in accordance with movements of the cam follower and support member.

8. The invention according to claim 7, with pivot means supporting each cam track from the high end thereof for swinging adjustment on a transversely extending axis and means for restraining the cam track against movement from an adjusted position.

9. The invention according to claim 7, with pivot means supporting each cam track from the high end thereof for swinging movement on a transversely extending axis, movable means engaging and resisting swinging movement of each cam track, and yieldable spring means maintaining said movable means in cam track movement resisting position.

10. In a motor vehicle, a body supporting chassis frame including vertically spaced transverse front end supporting beams, rear wheel running gear, spring suspension means between the running gear and each side of the chassis frame, steerable front wheel units disposed rearwardly of the front end of the chassis frame, a trailing parallelogram structure coupling the supporting beams of the chassis frame with each wheel unit and constructed to permit vertical swinging of the front wheels on a common transverse axis, a body support truss supported upon each end of the upper one of said beams and having a rearwardly extending substantially horizontal part disposed at a substantial elevation above the chassis frame, an upright body support arm supported on each wheel unit for swinging movement in a vertical plane extending longitudinally of the chassis, a spring suspension means disposed rearwardly of each arm and connected between the arm and the chassis frame for resilient yielding movement in a direction longitudinally of the chassis, and a camming thrust connection between the upper end of each arm and the horizontally disposed part of the adjacent body support truss whereby vertical movement of the body and chassis effects the said longitudinal yielding movement of the spring.

11. The invention according to claim 10, wherein each of said spring suspension means includes telescopically joined longitudinally extensible parts by which the connection between the chassis and arm is effected, means for extending said parts by fluid pressure, and means for transmitting thrust to the upper end of the arm through said spring upon extension of said parts.

12. The invention according to claim 10, wherein each of said spring suspension means includes a piston secured against movement to the chassis, a cylinder slidably receiving the piston in one end, a sleeve slidably receiving the other end of the cylinder and connected to the arm, means supporting said spring between the cylinder and the sleeve, and means for introducing fluid under pressure into the cylinder to elongate the suspension means by moving the cylinder and sleeve axially outwardly on the piston.

13. The invention according to claim 10, wherein said camming thrust connection embodies an elongate cam track pivotally connected at one end to the said horizontally disposed part of the body support and extending forwardly and downwardly in front of the adjacent support arm and a resilient overload compensation means in operative connection with the cam track and yieldable under overload of the vehicle body to permit the cam track to change its angle of inclination.

14. In a vehicle structure including running gear and a chassis frame, a wheel suspension means comprising a body support truss mounted on the chassis frame and including a horizontal part disposed in a plane at a substantial elevation above the chassis frame above a wheel of the running gear, an elongate cam track attached at one end to said horizontal part and extending therefrom at a downward inclination, an upright arm pivotally mounted on the running gear below said inclined track, a bracket on the chassis frame in spaced relation longitudinally thereof from said arm, an elongate fulcrum member mounted on and extending upwardly from the bracket, a spring suspension unit disposed horizontally between the arm and the fulcrum member and including telescopically joined members and a coil compression spring encircling and compressed between the telescopically joined members, means connecting the outer end of one of said joined members with the fulcrum member, means pivotally coupling the outer end of the other one of said joined members with the arm, a roller follower carried by the arm and thrust by the suspension unit against the cam track, and a coupling between the chassis frame adjacent to said fulcrum member and the said horizontal part of the body support above the suspension unit.

15. Vehicle wheel suspension means according to claim 14, with fluid pressure means for effecting elongation of the suspension unit to elevate the unit, chassis frame and body support truss relative to the running gear by application of thrust to the cam track and means actuated by the roller follower when the follower reaches a predetermined position on the cam track to check the elongation of the suspension unit by the fluid pressure means.

16. Vehicle wheel suspension means according to claim 14, with a fluid pressure system means for applying fluid pressure from said system to a member of the suspension unit to effect elongation of the unit to elevate the unit, chassis frame and body support truss relative to the running gear by thrusting the follower against the inclined surface of the cam track, normally closed valve means in said system which when open diverts pressurized fluid past the suspension unit, and an actuating member for said valve means positioned to be engaged and actuated by the roller follower to open the valve means when the follower reaches a predetermined position on the cam track to check elongation of the suspension unit.

17. In a vehicle structure including running gear and a chassis frame, a wheel suspension means comprising a body support truss mounted on the chassis frame and including a horizontal part disposed in a plane at a substantial elevation above the chassis frame above a wheel of the running gear, an elongate cam track body pivotally supported at one end on said horizontal part of the body support truss to swing on an axis extending transversely of the chassis, the cam track extending at a downward inclination, an upright arm mounted on the running gear below the cam track body to swing in a vertical plane perpendicular to said cam track axis, a bracket on the chassis frame in spaced relation longitudinally of the frame from said arm, an elongate fulcrum member on and extending upwardly from the bracket, a spring suspension unit disposed horizontally between the arm and the fulcrum member and including elongate parts slidably connected for relative longitudinal movement and a coil compression spring encircling and compressed between two of such parts, means connecting remote ends of two of such parts respectively with the fulcrum member and the arm, the connection with the arm being pivotal, a follower carried by the arm and having movable engagement against the underside of the cam track, and a spring overload compensation mechanism mounted upon and on the underside of said horizontal part of the support truss and including an element interposed between the upper side of the cam track and an overlying fixed bearing member and movable against the resistance of the mechanism spring between a first position and an overload position to permit movement of the cam track in a direction away from the spring suspension unit.

18. The invention according to claim 17, wherein the spring overload compensation mechanism embodies a pivotally mounted bell-crank lever, a coil spring fixed at one end to said horizontal part of the support truss, an operative coupling between an arm of the bell-crank lever and the other end of the coil spring, the said element comprising a roller, a link coupling the roller with the other arm of the lever and the fixed bearing member comprising a plate secured above the roller to said horizontal part of the support truss, and said first position and overload position being defined by dwell areas in and spaced longitudinally of the cam track body.

19. The invention according to claim 18, wherein the horizontal part of the support truss is in the form of a downwardly opening channel and includes a sub body support channel removably secured in the first channel and having the cam track body and spring overload compensation mechanism therein and carried thereby.

20. In a vehicle structure, a chassis frame having longitudinal side beams and vertically spaced transverse front end beams, rear wheel running gear, resilient body supporting means between the frame and the running gear, steerable front wheels located rearwardly of the front end beams, a king pin secured to each steerable wheel, vertically spaced tractor arms adjacent each wheel and pivotally connected respectively to the adjacent upper and lower front end beams for vertical swinging, universal pivot couplings between the upper and lower ends of the rear ends of respective adjacent upper and lower tractor arms, an inwardly extending stabilizing pin supported by each king pin, means for holding the stabilizing pin against movement around the king pin, an upright support arm mounted on each stabilizing pin for rocking movement thereon in a vertical plane, a body support truss mounted on the chassis frame and overlying said arm, a horizontally disposed elongate suspension means positioned rearwardly of each arm and including a coil spring, means coupling the unit between an adjacent side beam of the chassis frame and the upper end of the adjacent arm for compression and expansion of the coil spring in consonance with rocking movements of the arm, an elongate cam track body attached at one end to each body support truss and extending at a downward inclination across the upper end of the adjacent arm on the side of the arm away from the suspension means, and a follower carried by each arm and bearing against the underside of the adjacent cam track body.

21. The invention according to claim 20, wherein the body support truss includes a downwardly extending part directed toward the upper one of the front end beams and the mounting for the truss is effected by a pivot coupling between said downwardly extending part and the adjacent upper front end beam.

22. The invention according to claim 20, wherein said cam track body is attached to the support truss for pivotal movement and is provided upon the upper side with two depressed areas lying in longitudinally related relation with respect to the cam track body, a thrust plate secured above said areas, a bell crank having two angularly related arms and pivotally supported at the angle on the body support truss, a link pivotally attached at one end to one bell crank arm, a roller attached to the other end of said link and lying in and interposed between one of said areas and the thrust plate, an overload spring having one end coupled to the body support truss, and an operative coupling between the other end of the overload spring and the other bell crank arm, said cam track body functioning when swung in one direction to force said roller from one area to the other and thereby effect oscillation of the bell crank in a direction to put the overload spring under compression.

23. The invention according to claim 20, wherein each body support truss has a forward end and a rear end and said mounting being by a coupling between the forward end and one of said transverse front end beams, and downwardly and rearwardly extending linkage connecting the rear ends of the trusses with the chassis frame rearwardly of the adjacent suspension means.

24. In a motor vehicle, a chassis frame, rear wheel running gear, steerable front wheel running gear, means adjacent to the front and rear wheel running gear for supporting a body on the chassis frame, a pair of upright rear support arms mounted on the rear wheel running gear each adjacent to a rear wheel, a pair of upright front support arms mounted on the front wheel running gear each adjacent to a front wheel, the mounting for each of said support arms being pivotal, front and rear spring suspension units each located above the chassis frame rearwardly of a support arm, each of said units embodying a longitudinally disposed coil spring, a fixed support mounting the rear of each suspension unit on the chassis frame, a pivot coupling between the forward end of each suspension unit and the adjacent arm, an elongated cam member mounted on each body supporting means above the adjacent arm and extending at a forward and downward inclination across the top of the arm, and a follower element carried by each arm and bearing against the inclined under side of the adjacent cam member, the springs of the suspension units being independently compressed by and upon rearward swinging of the adjacent arm.

25. The invention according to claim 24, wherein the pivotal mounting for each rear support arm is universal and the pivotal mounting for each front support arm is on an axis extending transversely of the chassis frame.

26. The invention according to claim 24, wherein the pivotal mounting for the rear support arms is a ball and socket and the pivotal mounting for each front support arm comprises a pivot pin supported upon the adjacent front wheel king pin and extending in the transverse direction of the chassis frame and a bearing upon the lower end of the support arm turning on the pivot pin.

27. The invention according to claim 24, with a fluid pressure system, each of said suspension units being constructed to be elongated to apply thrust to the adjacent cam member by the follower in engagement therewith whereby elevation of the chassis frame and body supporting means may be effected, and means for effecting elongation of the suspension units by pressurized fluid from said system.

28. The invention according to claim 24, wherein the pivotal mounting for each rear support arm is a universal joint permitting swinging of each rear arm in all directions and wherein the pivotal mounting for each front support arm is on an axis extending transversely of the chassis frame, and means connecting the body support means with the rear wheel running gear which prevents horizontal transverse movement of the supported body but permits vertical movement and rocking movement of the body about a central longitudinal axis.

29. The invention according to claim 28, wherein the last stated means comprises a guide element attached to the body support means and an element carried by the differential housing and slidably connected with said guide element.

30. The invention according to claim 24, wherein the pivotal mounting for each rear support arm is a universal joint permitting swinging of each rear arm in all directions and wherein the pivotal mounting for each front support arm is on an axis extending transversely of the chassis frame, an elongate guide element secured at one end to and extending downward from the body support means adjacent to the rear wheel running gear and a roller follower mounted on the differential housing of the rear wheel running gear and coupled with said guide to move vertically therealong, said guide and roller functioning to prevent horizontal transverse movement of the body while permitting vertical and rotational body movement.

31. The invention according to claim 30, wherein the elongate guide element embodies two spaced parallel track rails and the mounting for the roller follower comprises a support arm mounted uprightly on the differential housing adjacent to and longitudinally of said track rails for oscillation on a transverse axis, said roller being rotatably mounted on the upper end portion of the arm and rotatably engaged between said rails.

32. In a motor vehicle, a chassis frame including longitudinal side beams, and transverse vertically spaced transverse front end beams, rear wheel running gear, steerable front wheel running gear comprising front wheels located rearwardly of the front end of the chassis frame, king pin spindles each secured to a front wheel and means for turning the same for steering, traction arms pivotally coupling the top and bottom ends of each king pin with the adjacent transverse beams for vertical swinging of the front wheels on a common transverse axis, a pivot pin supported horizontally by each king pin between the adjacent front end beams and extending inwardly, a stabilizing connection between the inner end of each pivot pin and a transverse beam, a body front end support truss at each side of the frame and having an elevated horizontal part and an upright part pivotally mounted on a transverse beam, a body rear end support truss mounted on each side beam and having an elevated part overlying the adjacent rear wheel running gear, a pair of upright rear support arms mounted for universal pivotal movement on the rear wheel running gear beneath the adjacent support truss elevated part, a pair of upright front support arms each mounted on a pivot pin for pivotal movement thereon, front and rear spring suspension units each located above the chassis frame rearwardly of a support arm, each of said units embodying a longitudinally disposed coil spring, a fixed support mounting the rear of each suspension unit on the chassis frame, a pivot coupling between the forward end of each suspension unit and the adjacent arm, an elongate cam member mounted on each body support truss elevated part above the adjacent arm and extending at a forward and downward inclination across the top of the arm, and a follower element carried by each arm and bearing against the inclined under side of the adjacent cam member, the springs of the suspension units being independently compressed by and upon rearward swinging of the adjacent arm.

33. In a motor vehicle, a chassis frame including longitudinal side beams, and transverse vertically spaced transverse front end beams, rear wheel running gear, steerable front wheel running gear comprising front wheels located rearwardly of the front end of the chassis frame, king pin spindles each secured to a front wheel and means for turning the same for steering, traction arms pivotally coupling the top and bottom ends of each king pin with the adjacent transverse beams for vertical swinging of the front wheels on a common transverse axis, a pivot pin supported horizontally by each king pin between the adjacent front end beams and extending inwardly, a stabilizing connection between the inner end of each pivot pin and a transverse beam, a body front end support truss at each side of the frame and having an elevated horizontal part and an upright part pivotally mounted on a transverse beam, a body rear end support truss mounted on each side beam and having an elevated part overlying the adjacent rear wheel running gear, a pair of upright rear support arms mounted for universal pivotal movement on the rear wheel running gear beneath the adjacent support truss elevated part, a pair of upright front support arms each mounted on a pivot pin for pivotal movement thereon, front and rear spring suspension units each located above the chassis frame rearwardly of a support arm, each of said units embodying a longitudinally disposed coil spring, a fixed support mounting the rear of each suspension unit on the chassis frame, a pivot coupling between the forward end of each suspension unit and the adjacent arm, an elongate cam member pivotally attached at one end to the underside of the elevated part of each support to swing on a transversely extending axis above the adjacent arm, each cam member being at a forward and downward inclination across the top of the arm, a follower element carried by each arm and bearing against the inclined underside of the adjacent cam member, each suspension unit embodying a piston which is coupled with the rear support mounting, a cylinder having an end receiving an end of the piston and a sleeve receiving the other end of the cylinder, one end of the sleeve providing the forward end of the suspension unit coupled to the adjacent arm, the spring of each suspension unit being mounted between the sleeve and the cylinder to be compressed upon rearward swinging of the adjacent arm, a fluid pressure system, means for introducing pressurized fluid into the cylinders to elongate the units to effect elevation of the body, and overload compensation mechanism embodying spring resisting means functioning on overload to permit the load carrying cams to swing to a low spring rate position.

34. In a motor vehicle, a chassis frame including longitudinal side beams, and transverse vertically spaced transverse front end beams, rear wheel running gear, steerable front wheel running gear comprising front wheels located rearwardly of the front end of the chassis frame, king pin spindles each secured to a front wheel and means for turning the same for steering, traction arms pivotally coupling the top and bottom ends of each king pin with the adjacent transverse beams for vertical swinging of the front wheels on a common transverse axis, a pivot pin supported horizontally by each king pin between the adjacent front end beams and extending inwardly, a stabilizing connection between the inner end of each pivot pin and a transverse beam, a body front end support truss at each side of the frame and having an elevated horizontal part and an upright part pivotally mounted on a transverse beam, a body rear end support truss mounted on each side beam and having an elevated part overlying the adjacent rear wheel running gear, a pair of upright rear support arms mounted for universal pivotal movement on the rear wheel running gear beneath the adjacent support truss elevated part, a pair of upright front support arms each mounted on a pivot pin for pivotal movement thereon, front and rear spring suspension units each located above the chassis frame rearwardly of a support arm, each of said units embodying a longitudinally disposed coil spring, a fixed support mounting the rear of each suspension unit on the chassis frame, a pivot coupling between the forward end of each suspension unit and the adjacent arm, an elongate cam member attached at one end to the underside of the elevated part of each support, each cam member being at a forward and downward inclination across the top of the arm, a follower element carried by each arm and bearing against the inclined underside of the adjacent cam member, each suspension unit embodying a piston which is coupled with the rear support mounting, a cylinder having an end receiving an end of the piston and a sleeve receiving the other end of the cylinder, one end of the sleeve providing the forward end of the suspension unit coupled to the adjacent arm, the spring of each suspension unit being mounted between the sleeve and the cylinder to be compressed upon rearward swinging of the adjacent arm, a fluid pressure system, means for introducing pressurized fluid into the cylinders to elongate the units to effect elevation of the body.

35. The invention according to claim 34 wherein said fluid pressure system includes a fluid pump, shiftable clutch means for establishing driving connection of the pump with a power source to pressurize the system, conduits in said system for carrying pressurized fluid past each unit by which introduction of pressurized fluid into the unit may be stopped, a control valve in each of said conduits, and means for effecting the opening of the control valve by the cam member follower at a predetermined position of the follower on the cam member.

36. In a motor vehicle, a chassis frame, rear wheel running gear, resilient suspension means between said gear and the frame, steerable front wheels, mechanism operatively coupling the front wheels with the chassis for vertical swinging movement and for steering turning movement about substantially vertical spindles, and suspension means between each of said spindles and the chassis frame adapted to maintain the chassis frame in either of two selected elevated states relative to the running gear and embodying a vertical arm supported by and rising above and on the inner side of the spindle, a horizontally disposed coil compression spring extending longitudinally of the chassis frame rearwardly of the arm and an expansible chamber power unit encased by the spring and cooperatively connected therewith for applying thrust longitudinally of and to the spring to effect the said chassis frame elevated states.

37. In a motor vehicle, a chassis frame, rear wheel running gear, resilient suspension means between said gear and the frame, steerable front wheels, a spindle for and about which each front wheel turns, mechanism connecting the two ends of each spindle with the chassis frame, means for effecting steering turning of the steerable wheels about the spindles, and suspension means between each of said spindles and the chassis frame embodying a support means carried by each spindle and secured to the frame against movement relative to the spindle, an upright body support arm mounted on and rising from the support means and a horizontally disposed coil compression spring connected at one end with the upper end of the arm and extending longitudinally of and connected at its other end with the chassis frame.

38. In a motor vehicle, a chassis frame, rear wheel running gear, resilient suspension means between said gear and the frame, steerable front wheels, a spindle for and about which each front wheel turns, mechanism connecting the top and bottom portions of each spindle with the chassis frame, means for effecting steering turning of the wheels about said spindles, and suspension means between each of said spindles and the chassis frame embodying a bearing unit encircling and supported on the spindle, a bracket fixed to the bearing unit and extending horizontally inwardly from the spindle, means securing the bracket to the chassis frame against movement relative to the spindle, an upright body support arm mounted on said bracket, and a horizontally disposed coil compression spring connected at one end with the upper end of the arm and coupled at its other end with the chassis frame.

39. The invention according to claim 38, wherein the mounting of the support arm includes a pivot pin carried by the bracket and a bearing carried by the arm and receiving the pivot pin for facilitating turning movement of the arm on an axis directed transversely of the chassis.

40. The invention according to claim 37, wherein said mechanism is connected to the chassis frame forwardly of the spindle and is constructed to permit up and down swinging movement of the steerable wheel on a pivot axis directed transversely of the chassis frame.

41. In a motor vehicle, a chassis frame, rear wheel running gear, resilient suspension means between said gear and the frame, steerable front wheels, a spindle for and about which each front wheel turns, mechanism pivotally connecting each spindle with the chassis frame at points located forwardly of the spindle whereby the wheel and spindle has up and down movement relative to the frame, a body support truss mounted on the chassis forwardly of each spindle and overlying the adjacent wheel, means for effecting steering turning of the steerable wheels about the spindles, and front end body and chassis suspension means embodying a support bracket carried by each spindle and secured to the frame against movement relative to the spindle, an upright body support arm pivotally supported by each bracket below the adjacent truss, for swinging on an axis directed transversely of the frame, a horizontally disposed coil compression spring connected at one end with the upper end of the arm, means connecting the other end of the spring with the chassis, an inclined body supporting thrust cam track carried by each truss over the upper end of the adjacent arm and on the side of the arm remote from the spring, and a follower carried by the arm and having body supporting engagement with the cam track.

42. The invention according to claim 41, and an expansible chamber power unit means associated with each spring and interposed between the said means connecting the other end of the spring with the frame and the upper end of the arm for applying thrust to the adjacent cam track to effect elevation of the body and chassis.

References Cited in the file of this patent

UNITED STATES PATENTS

| | | |
|---|---|---|
| 2,007,952 | Armstrong | July 16, 1935 |
| 2,018,427 | Taber | Oct. 22, 1935 |
| 2,150,576 | Bell | Mar. 14, 1939 |
| 2,233,145 | Schimek | Feb. 25, 1941 |
| 2,643,110 | Gregoire | June 23, 1953 |
| 2,650,108 | Bruce | Aug. 25, 1953 |